(12) United States Patent
Ide et al.

(10) Patent No.: US 11,415,804 B2
(45) Date of Patent: Aug. 16, 2022

(54) VIRTUAL IMAGE DISPLAY APPARATUS

(71) Applicant: SEIKO EPSON CORPORATION, Tokyo (JP)

(72) Inventors: Mitsutaka Ide, Shiojiri (JP); Masatoshi Yonekubo, Suwa-gun Hara-Mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 66 days.

(21) Appl. No.: 16/830,873

(22) Filed: Mar. 26, 2020

(65) Prior Publication Data
US 2020/0310133 A1 Oct. 1, 2020

(30) Foreign Application Priority Data

Mar. 27, 2019 (JP) .............................. JP2019-059642

(51) Int. Cl.
| | |
|---|---|
| *G02B 27/01* | (2006.01) |
| *F21V 8/00* | (2006.01) |
| *G02B 27/00* | (2006.01) |
| *G02B 27/42* | (2006.01) |

(52) U.S. Cl.
CPC ......... *G02B 27/0172* (2013.01); *G02B 6/003* (2013.01); *G02B 6/005* (2013.01); *G02B 27/0081* (2013.01); *G02B 27/4227* (2013.01); *G02B 2027/0174* (2013.01); *G02B 2027/0178* (2013.01)

(58) Field of Classification Search
None
See application file for complete search history.

(56) References Cited

U.S. PATENT DOCUMENTS

| | | | | |
|---|---|---|---|---|
| 2004/0252377 | A1* | 12/2004 | Urey .................... | G02B 27/144 359/566 |
| 2006/0228073 | A1* | 10/2006 | Mukawa ............ | G02B 17/0856 385/31 |
| 2014/0210813 | A1* | 7/2014 | Sato ..................... | H04N 13/122 345/419 |
| 2016/0161755 | A1* | 6/2016 | Yonekubo .......... | G02B 27/0081 345/8 |
| 2017/0261751 | A1 | 9/2017 | Noguchi et al. | |
| 2018/0285620 | A1* | 10/2018 | Wagner ............... | A61B 5/0077 |
| 2019/0235266 | A1 | 8/2019 | Ide et al. | |

FOREIGN PATENT DOCUMENTS

| | | |
|---|---|---|
| JP | 2017-167181 A | 9/2017 |
| JP | 2019-133132 A | 8/2019 |

* cited by examiner

*Primary Examiner* — Chris H Chu
(74) *Attorney, Agent, or Firm* — Oliff PLC

(57) ABSTRACT

A virtual image display apparatus includes an imaging light emitting unit configured to emit imaging light, and a light-guiding unit configured to guide the imaging light. The light-guiding unit is configured by arranging a first, a second, a third, and a fourth optical system in the stated order in a travel direction of the imaging light. The first optical system forms a first intermediate image of the imaging light. The second optical system includes a first diffraction element forming a pupil between the second and the fourth optical system. The third optical system forms a second intermediate image. The fourth optical system includes a second diffraction element forming an exit pupil by diffracting the imaging light. At the exit pupil, luminance of pixels at a central position of the imaging light and luminance of pixels at end positions of the imaging light differ.

8 Claims, 22 Drawing Sheets

VIRTUAL IMAGE DISPLAY APPARATUS

The present application is based on, and claims priority from JP Application Serial Number 2019-059642, filed Mar. 27, 2019, the disclosure of which is hereby incorporated by reference herein in its entirety.

BACKGROUND

1. Technical Field

The present disclosure relates to a virtual image display apparatus.

2. Related Art

In the prior art, a known technology uses two hologram elements to correct wavelength dispersion when performing diffraction with hologram elements.

For example, the display apparatus disclosed in JP-A-2017-167181 includes a first diffraction element that deflects imaging light emitted from an imaging light generating device, and a second diffraction element disposed on an optical path starting at a light source unit of the imaging light generating device and ending at the first diffraction element. When a light beam with a single wavelength is incident from the normal direction, the first diffraction element and the second diffraction element each emit diffraction light having the highest diffraction efficiency in one direction. When the sum of the number of times light is reflected and the number of times an intermediate image is generated between the second diffraction element and the first diffraction element is an even number, the direction in which the diffraction light having the highest diffraction efficiency is emitted when a light beam is incident from the normal direction is on the same side of the first diffraction element and the second diffraction element with the normal direction of each incident surface as a reference. If the sum of the number of times light is reflected and the number of times an intermediate image is generated between the second diffraction element and the first diffraction element is an odd number, the direction in which the diffraction light having the highest diffraction efficiency is emitted when a light beam is incident from the normal direction is on opposite sides of the first diffraction element and the second diffraction element.

With the display apparatus disclosed in JP-A-2017-167181, a decrease in resolution and the like can be suppressed even when wavelength fluctuations occur in the light emitted from the light source.

However, as disclosed in JP-A-2017-167181, in an optical system performing wavelength compensation using two hologram elements, a first mirror that reflects imaging light toward the first hologram element and a second mirror disposed between the first hologram element and the second hologram element are provided if the angles of diffraction of the first hologram element and the second hologram element are the same. If the angles of diffraction of the first hologram element and the second hologram element are large, the size of the apparatus increases. Further, if the angles of diffraction of the first hologram element and the second hologram element are small, the first mirror and the second mirror interfere with each other.

When these angles of diffraction are varied, a lens or the like can be added for causing light having a predetermined wavelength, as well as light having a short or long wavelength relative to the predetermined wavelength, in dispersed imaging light to be incident on an exit pupil as parallel light in order to compensate for insufficient optical power.

However, in order to ensure that the diameter of the pupil is large enough that an observer can view the image even when the viewing direction changes, it is necessary to ensure that imaging light corresponding to end portions of the pupil diameter propagates. As a result, it is necessary to ensure intervals between the optical members in the display apparatus to avoid interference between the first mirror and the second mirror, and this makes it difficult to reduce the size of the apparatus.

SUMMARY

One aspect for solving the above-described problem includes an imaging light emitting unit configured to emit imaging light constituted by light of a plurality of pixels, and a light-guiding unit configured to guide the imaging light, in which the light-guiding unit is configured by arranging a first optical system, a second optical system, a third optical system, and a fourth optical system in the stated order in a travel direction of the imaging light, the first optical system forms a first intermediate image of the imaging light, the second optical system includes a first diffraction element forming a pupil between the second optical system and the fourth optical system, the third optical system forms a second intermediate image, the fourth optical system includes a second diffraction element forming an exit pupil by diffracting the imaging light, and, at the exit pupil, luminance of the plurality of pixels at a central position of the imaging light differs from luminance of the plurality of pixels at end positions of the imaging light.

In the above-described virtual image display apparatus, the luminance of the plurality of pixels at end positions may be greater than or equal to 60% of the luminance of the plurality of pixels at the central position.

In the above-described virtual image display apparatus, one of the imaging light emitting unit and the light-guiding unit may include a luminance adjustment member configured to adjust luminance of the imaging light.

In the above-described virtual image display apparatus, the third optical system may include a mirror having a reflective surface that reflects the imaging light emitted from the second optical system toward the fourth optical system, and, in the mirror, at least one of a first end portion on a side close to the first optical system and a second end portion on a side far from the first optical system may be shortened such that the luminance of the plurality of pixels at the central position of the imaging light and the luminance of the plurality of pixels at the end positions of the imaging light differ at the exit pupil.

In the above-described virtual image display apparatus, the first optical system may include a mirror having a reflective surface that reflects the imaging light emitted from the imaging light emitting unit toward the second optical system, and, in the mirror, at least one of a first end portion on a side far from the third optical system and a second end portion on a side close to the third optical system may be shortened such that the luminance of the plurality of pixels at the central position of the imaging light and the luminance of the plurality of pixels at the end positions of the imaging light differ at the exit pupil.

DESCRIPTION OF EXEMPLARY EMBODIMENTS

1. Configuration of Display Apparatus 1-1. Overall Configuration of Display Apparatus FIG. 1 is an external perspective view illustrating an exemplary external appearance of a display apparatus 1 according to an embodiment of the present disclosure.

Figure 1:
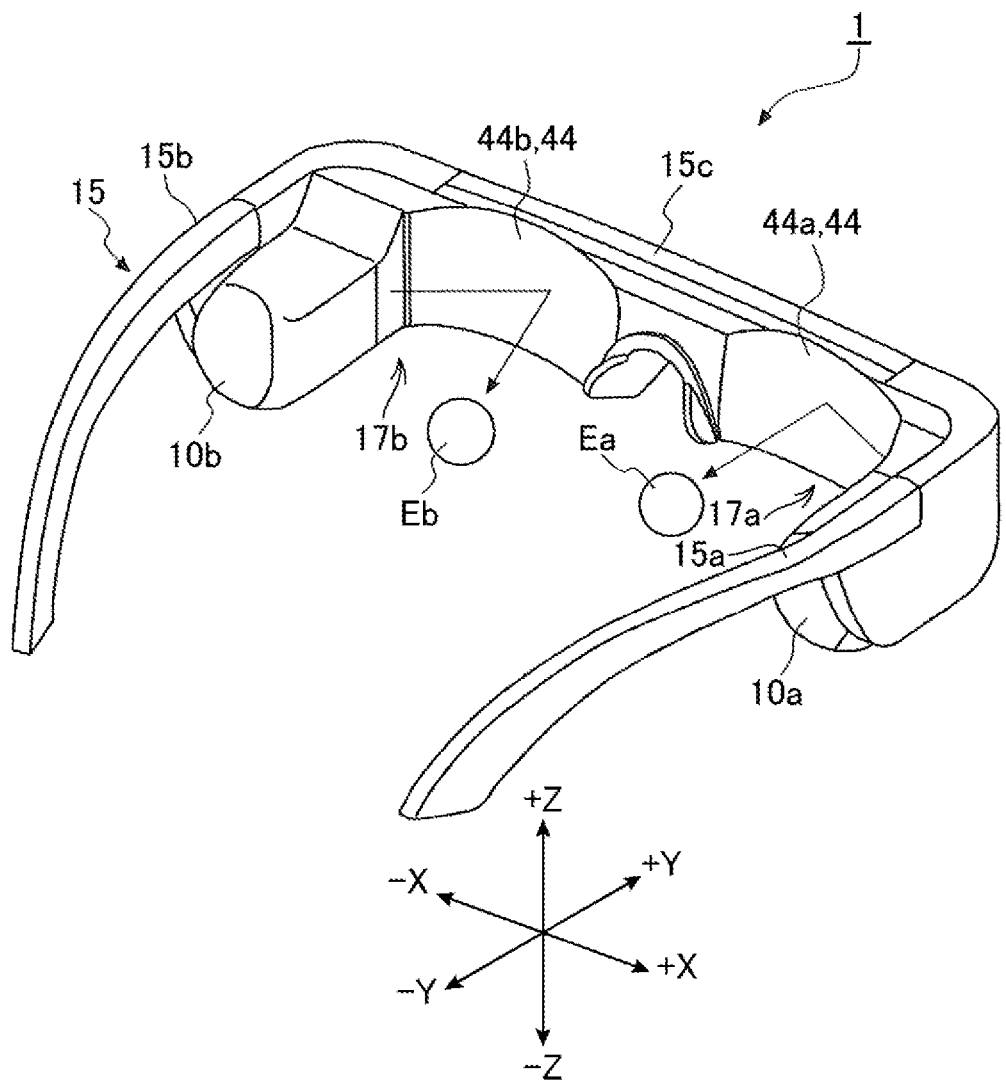
FIG. 1 is an external perspective view illustrating the external appearance of a display apparatus.

In FIG. 1, the X-, Y-, and Z-axes are orthogonal to each other. The Z-axis is parallel to the vertical direction, and the X- and Y-axes are both parallel to a horizontal plane. The X-axis direction represents a left-right direction and the Y-axis direction represents a front-rear direction. The +X direction represents a rightward direction, and the −X direction represents a leftward direction. The +Y direction represents a forward direction and the −Y direction represents a rearward direction. The +Z direction represents an upward direction and the −Z direction represents a downward direction.

The display apparatus 1 is a head-mounted display apparatus. The display apparatus 1 includes an imaging light emitting unit 10a for the right eye that uses illumination light emitted from an organic light-emitting diode (OLED) as a light source, and a light-guiding member 17a for the right eye configured to guide imaging light emitted from the imaging light emitting unit 10a for the right eye and cause the imaging light to be incident on a right eye Ea of a user. Note that, in the embodiments of the present disclosure, "user" refers to a user wearing the display apparatus 1. The display apparatus 1 corresponds to an example of a "virtual image display apparatus". Further, "user" indicates a user wearing the display apparatus 1. FIG. 1 illustrates a fourth optical system 44a included in the light-guiding unit 17a.

The display apparatus 1 further includes an imaging light emitting unit 10b for the left eye that uses illumination light emitted from an OLED as a light source, and a light-guiding unit 17b for the left eye configured to guide imaging light emitted from the imaging light emitting unit 10b for the left eye and cause the imaging light to be incident on a left eye Eb of the user. FIG. 1 illustrates a fourth optical system 44b included in the light-guiding unit 17b.

The display apparatus 1 is a head-mounted body having an eyeglass shape worn on the head of a user, and includes a frame 15. The frame 15 includes a temple 15a on the right, a temple 15b on the left, and a front member 15c. The imaging light emitting unit 10a and the imaging light emitting unit 10b are both provided in the frame 15. Specifically, the imaging light emitting unit 10a is provided on a right end portion of the frame 15, and the imaging light emitting unit 10b is provided on a left end portion of the frame 15. The front member 15c of the frame 15 supports the fourth optical system 44a and the fourth optical system 44b.

In FIG. 1, a case is illustrated in which the display apparatus 1 is a display apparatus for both eyes and includes the imaging light emitting unit 10a, the imaging light emitting unit 10b, the light-guiding unit 17a, and the light-guiding unit 17b. However, the display apparatus 1 may be a monocular display apparatus. When the display apparatus 1 is a monocular display apparatus, the display apparatus 1 need only include, for example, the imaging light emitting unit 10b and the light-guiding unit 17b among the imaging light emitting unit 10a, the imaging light emitting unit 10b, the light-guiding unit 17a and the light-guiding unit 17b. In this case, the display apparatus 1 is a display apparatus for the left eye. Alternatively, the display apparatus 1 need only include, for example, the imaging light emitting unit 10a and the light-guiding unit 17a among the imaging light emitting unit 10a, the imaging light emitting unit 10b, the light-guiding unit 17a and the light-guiding unit 17b. In this case, the display apparatus 1 is a display apparatus for the right eye.

First and second embodiments to be described with reference to FIGS. 5 to 11 deal with a case where the display apparatus 1 is a display apparatus for the left eye, and third and fourth embodiments to be described with reference to FIGS. 12 to 22 deal with a case where the display apparatus 1 is a display apparatus for both eyes.

1-2. Configuration of Imaging Light Emitting Unit and Light-Guiding Unit

Figure 2:
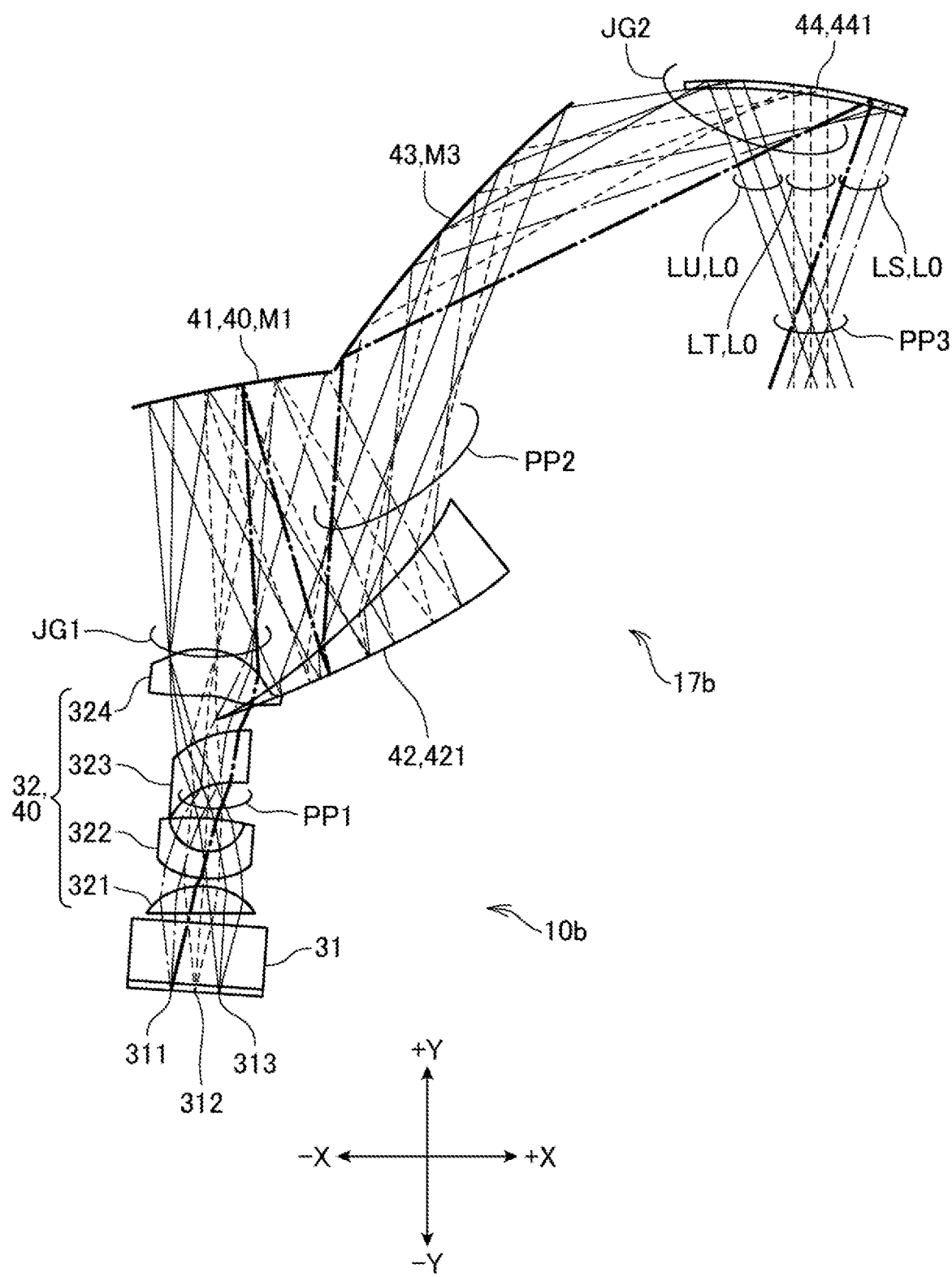
FIG. 2 is a configuration diagram of an imaging light emitting unit and a light-guiding unit for the left eye.
Figure 3:
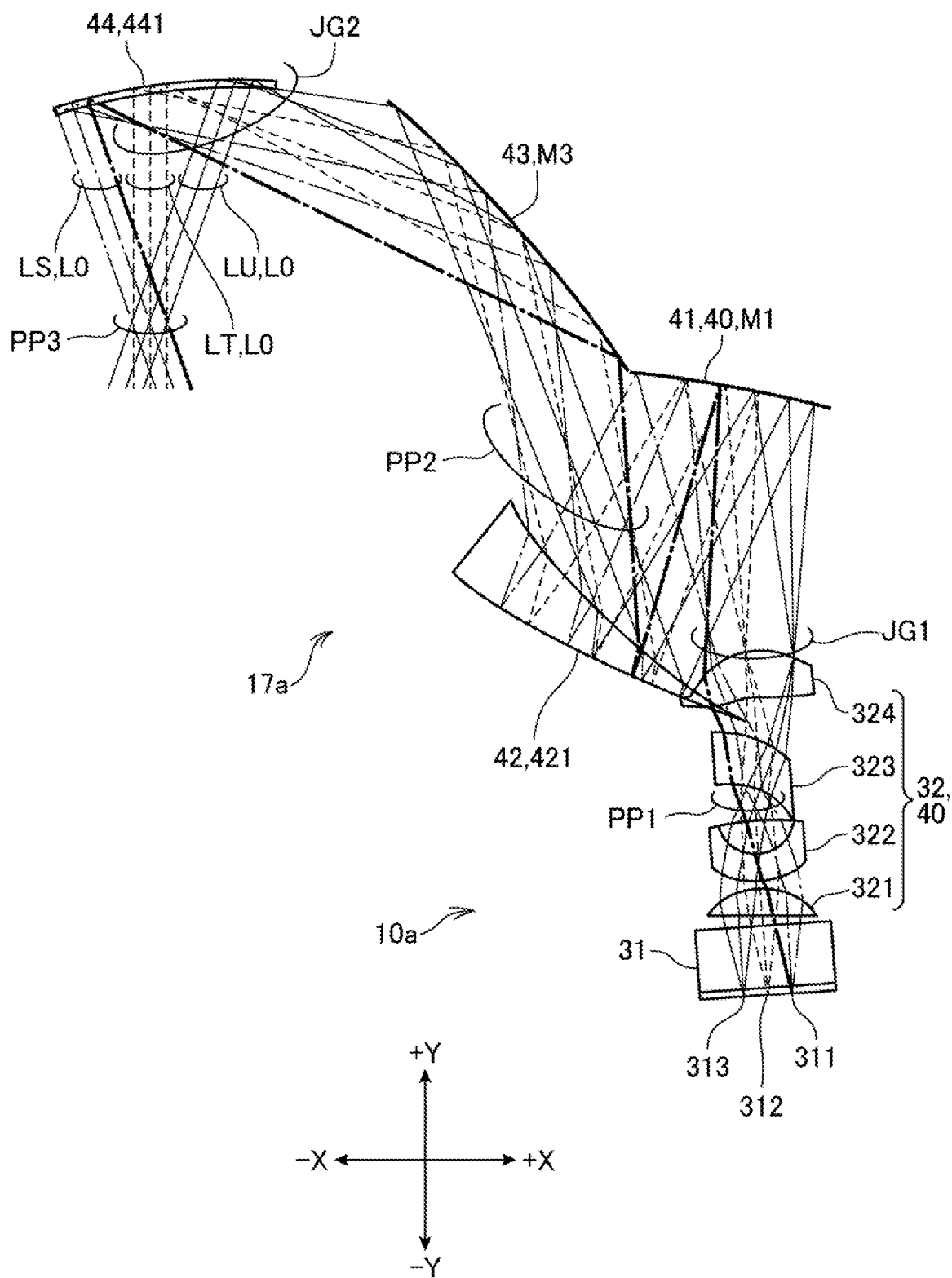
FIG. 3 is a configuration diagram of an imaging light emitting unit and a light-guiding unit for the right eye.

FIG. 2 is a configuration diagram of the imaging light emitting unit 10b and the light-guiding unit 17b for the left eye. FIG. 3 is a configuration diagram of the imaging light emitting unit 10a and the light-guiding unit 17a for the right eye. As illustrated in FIGS. 2 and 3, the configuration of the imaging light emitting unit 10a is the same as the configuration of the imaging light emitting unit 10b, and the configuration of the light-guiding unit 17a is the same as the configuration of the light-guiding unit 17b.

However, the imaging light emitting unit 10a is arranged in plane symmetry with a plane that passes through the imaging light emitting unit 10b and a central position of the front member 15c of the frame 15 in the X-axis direction and is parallel to a Y-Z plane that includes the Y- and Z-axes. The light-guiding unit 17a is arranged in plane symmetry with a plane that passes through the light-guiding unit 17b and a central position of the front member 15c of the frame 15 in the X-axis direction and is parallel to a Y-Z plane that includes the Y- and Z-axes. In other words, the imaging light emitting unit 10a is disposed with the imaging light emitting unit 10b in a left-right inverted state, and the light-guiding unit 17a is disposed with the light-guiding portion 17b in a left-right inverted state.

Note that the imaging light emitting unit 10a may be disposed at the same orientation as the imaging light emitting unit 10b, and the light-guiding unit 17a may be disposed at the same orientation as the light-guiding unit 17b. The imaging light emitting unit 10a and the light-guiding unit 17a may also be disposed in a linearly symmetrical manner, and the imaging light emitting unit 10b and the light-guiding unit 17b may be disposed in a linearly symmetrical manner.

Thus, in the following description, the imaging light emitting unit 10b and the light-guiding unit 17b will be described with reference to FIG. 2, and a description of the imaging light emitting unit 10a and the light-guiding unit 17a illustrated in FIG. 3 will be omitted.

In addition, because the fourth optical system 44a constituting the light-guiding unit 17a and the fourth optical system 44b constituting the light-guiding unit 17b have the same configuration, the fourth optical system 44a and the fourth optical system 44b are collectively referred to as "fourth optical system 44" in FIG. 2 and subsequent figures.

As illustrated in FIG. 2, the imaging light emitting unit 10b includes a light source unit 31.

The light source unit 31 emits light source light prior to light modulation, or modulated imaging light. In the embodiments of the present disclosure, a case in which the light source unit 31 emits modulated imaging light L0 will be described. The imaging light L0 includes blue light LB, red light LR, and green light LG. The light source unit 31 includes a single OLED configured to emit the imaging light. The single OLED in the light source unit 31 includes a first pixel 311 representing an example of a pixel disposed on the left side, a second pixel 312 representing an example of a centrally disposed pixel, and a third pixel 313 representing an example of a pixel disposed on the right side.

The first pixel 311, the second pixel 312, and the third pixel 313 are all disposed in the OLED. A control unit (not shown) executes control to emit light flux modulated to various light intensities corresponding to each pixel of an image to be displayed.

The light-guiding unit 17b is configured by arranging a first optical system 40, a second optical system 42, a third optical system 43, and the fourth optical system 44 in the travel direction of the imaging light L0 in the stated order.

The first optical system 40 includes a projection optical system 32 and a first reflective optical system 41.

The projection optical system 32 guides the imaging light L0 emitted from the light source unit 31 to the first reflective optical system 41. The projection optical system 32 includes a first lens 321, a second lens 322, a third lens 323 and a fourth lens 324. Each of the first lens 321, the second lens 322, the third lens 323, and the fourth lens 324 is constituted by a spherical, aspherical, or free-form lens. In FIG. 2, an example is given of a case in which the number of lenses in the projection optical system 32 is four, but the number of lenses is not limited thereto. The projection optical system 32 may include five or more lenses. Further, the projection optical system 32 may be formed by bonding the lenses together.

In addition, a first pupil PP1 is formed between the second lens 322 and the third lens 323.

The first reflective optical system 41 forms a first intermediate image JG1 of the imaging light L0 in front of the second optical system 42. An "intermediate image" corresponds to a location where light beams emitted from one pixel converge.

The first reflective optical system 41 reflects the imaging light L0 emitted from the projection optical system 32 toward the second optical system 42. The first reflective optical system 41 is constituted by a mirror Ml having a reflective surface formed on a recessed curved surface, where a central portion of the surface is recessed further than a peripheral portion of the surface. The reflective surface may be a spherical surface, an aspherical surface, or a free form surface.

The second optical system 42 includes a first diffraction element 421 that forms a second pupil PP2 between the second optical system 42 and the fourth optical system 44. Specifically, the second optical system 42 forms the second pupil PP2 between the second optical system 42 and the third optical system 43. The second optical system 42 guides the imaging light L0 emitted from the first reflective optical system 41 to the third optical system 43. Here, "pupil" indicates the location where primary light beams for each angle of view converge. The first diffraction element 421 will be described with reference to FIG. 4.

In the present embodiment, the second pupil PP2 is formed between the second optical system 42 and the third optical system 43, but the second pupil PP2 may be formed between the second optical system 42 and the fourth optical system 44. For example, the second pupil PP2 may be formed between the third optical system 43 and the fourth optical system 44.

The third optical system 43 forms a second intermediate image JG2 in front of the fourth optical system 44. The third optical system 43 reflects the imaging light L0 emitted from the second optical system 42 toward the fourth optical system 44. The third optical system 43 is constituted by a mirror M3 having a reflective surface formed on a recessed curved surface, where a central portion of the surface is recessed further than a peripheral portion of the surface. The reflection surface may be a spherical surface, an aspherical surface, or a free form surface. In the exemplary embodiments of the present disclosure, the third optical system 43 is a total-reflection mirror having a reflection surface consisting of a free-form surface. However, the third optical system 43 may be a half mirror. In this case, the visible range of external light can be increased.

The fourth optical system 44 includes a second diffraction element 441, and substantially collimates at least part of the imaging light L0 to form an exit pupil PP3 at a viewing position. The fourth optical system 44 guides the imaging light L0 emitted from the third optical system 43 to the viewing position. In the embodiments of the present disclosure, "exit pupil" refers to an image that is imaged to the fourth optical system 44 downstream of the imaging light L0 in the travel direction. That is, the "exit pupil" indicates the pupil formed within the left eye Eb of the user. The second diffraction element 441 will be described with reference to FIG. 4.

As described above with reference to FIG. 2, in the light-guiding unit 17b, the first intermediate image of the imaging light L0 is formed between the first reflective optical system 41 and the third optical system 43, and the pupil is formed between the second optical system 42 and the fourth optical system 44. Further, the second intermediate image of the imaging light L0 is formed between the third optical system 43 and the fourth optical system 44, and the fourth optical system 44 substantially collimates the imaging light L0 to form the exit pupil. At this time, the third optical system 43 converges all imaging light KO emitted from the second optical system 42 to form a second intermediate image JG2. Then, the third optical system 43 causes the imaging light KO to be incident as divergent light on the fourth optical unit 44. The pupil is formed between the second optical system 42 and the fourth optical system 44, more specifically, between the second optical system 42 and the third optical system 43.

Accordingly, light beams emitted from one point of the imaging light emitting unit 10a form an image as one point on a retina. As a result, the user can visibly recognize one pixel. Because the pupil of the light-guiding unit 17b and the pupil of the left eye Eb are in a conjugated relationship (coupling of the pupil), the entire image emitted from the imaging light emitting unit 10a can be viewed by the user.

1-3. Configuration of First Diffraction Element and Second Diffraction Element

Now, the configuration of the first diffraction element 421 and the second diffraction element 441 will be described with reference to FIG. 4. In the embodiments of the present disclosure, the first diffraction element 421 and the second diffraction element 441 have the same basic configuration. Hereinafter, the configuration of the second diffraction element 441 will be described as an example.

Figure 4:
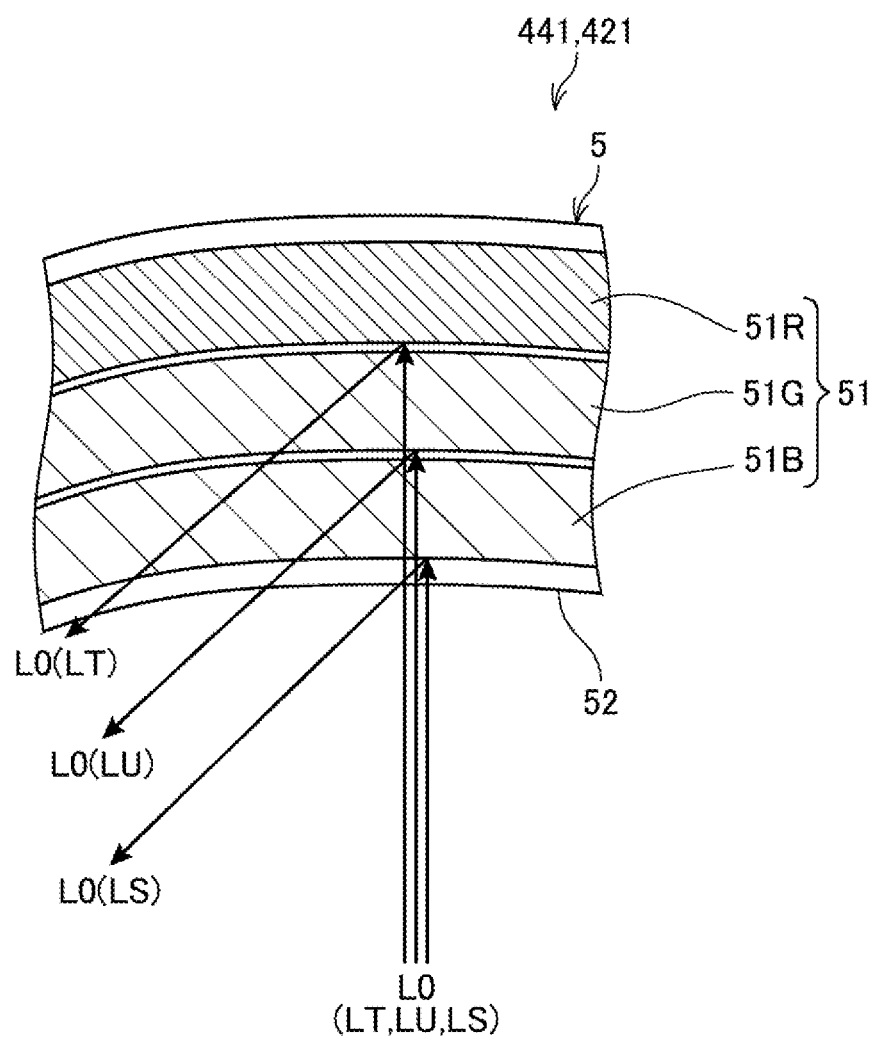
FIG. 4 is a cross-sectional view illustrating the configuration of a second diffraction element.

FIG. 4 is a cross-sectional view illustrating the configuration of the second diffraction element 441. The second diffraction element 441 includes the reflection-type volume holographic element 55 illustrated in FIG. 4. The reflection-type volume holographic element 55 is a partial reflection-type diffraction optical element. Therefore, external light is also incident on the left eye Eb via the second diffraction element 441. As a result, the user can view an image obtained by superimposing the imaging light L0 formed by the image light generating device 10b and external light (background image).

The second diffraction element 441 faces the left eye Eb of the user. An incident surface 52 of the second diffraction element 441 on which the imaging light L0 is incident has a recessed curved surface recessed in a direction away from the left eye Eb. In other words, the incident surface 52 is formed into a shape having a central portion recessed and curved with respect to a peripheral portion in the incident direction of the imaging light L0. Thus, the second diffraction element 441 can efficiently condense the imaging light L0 toward the left eye Eb of the observer.

The second diffraction element 441 includes interference patterns 51 having a pitch corresponding to a specific wavelength. The interference patterns 51 are recorded in a hologram photosensitive layer as a difference in refractive index or another factor. The interference patterns 51 are inclined in one direction with respect to the incident surface 52 of the second diffraction element 441 so as to correspond to a specific incident angle. Therefore, the second diffraction element 441 diffracts and then deflects the imaging light L0 in a predetermined direction. The specific wavelength corresponds to the wavelength of the imaging light L0, and the specific incident angle corresponds to an incident angle.

In the embodiments of the present disclosure, the imaging light L0 is used for color display and therefore includes the red light LR, the green light LG and the blue light LB. Thus, the second diffraction element 441 includes a first interference fringe 51R, a second interference fringe 51G and a third interference fringe 51B formed at a pitch corresponding to the specific wavelength. The first interference pattern 51R is formed at, for example, a pitch corresponding to the red light LR having a wavelength of 615 nm included in a wavelength range of from 580 nm to 700 nm. The second interference pattern 51G is formed at, for example, a pitch corresponding to the green light LG having a wavelength of 535 nm included in a wavelength range of from 500 nm to 580 nm. The third interference pattern 51B is formed at, for example, a pitch corresponding to the blue light LB having a wavelength of 460 nm included in a wavelength range of from 400 nm to 500 nm.

Note that a photosensitive material having sensitivity corresponding to each wavelength of the red light LR, the green light LG, and the blue light LB may be dispersed in the holographic photosensitive layer, and the interference fringe 51 may be formed by superimposing the first interference fringe 51R, the second interference fringe 51G and the third interference fringe 51 into one layer.

The first diffraction element 421 with the same basic configuration as the second diffraction element 441 is provided with the reflective volume holographic element 5. The incident surface 52 of the first diffraction element 421 on which the imaging light L0 is incident has a recessed curved surface. In other words, the incident surface 52 has a shape in which a central portion is recessed and curved with respect to a peripheral portion in the incident direction of the imaging light L0. Thus, the first diffraction element 421 can efficiently deflect the imaging light L0 toward the third optical system 43.

1-4. Method for Reducing Size of Light-Guiding Unit

Figure 5:
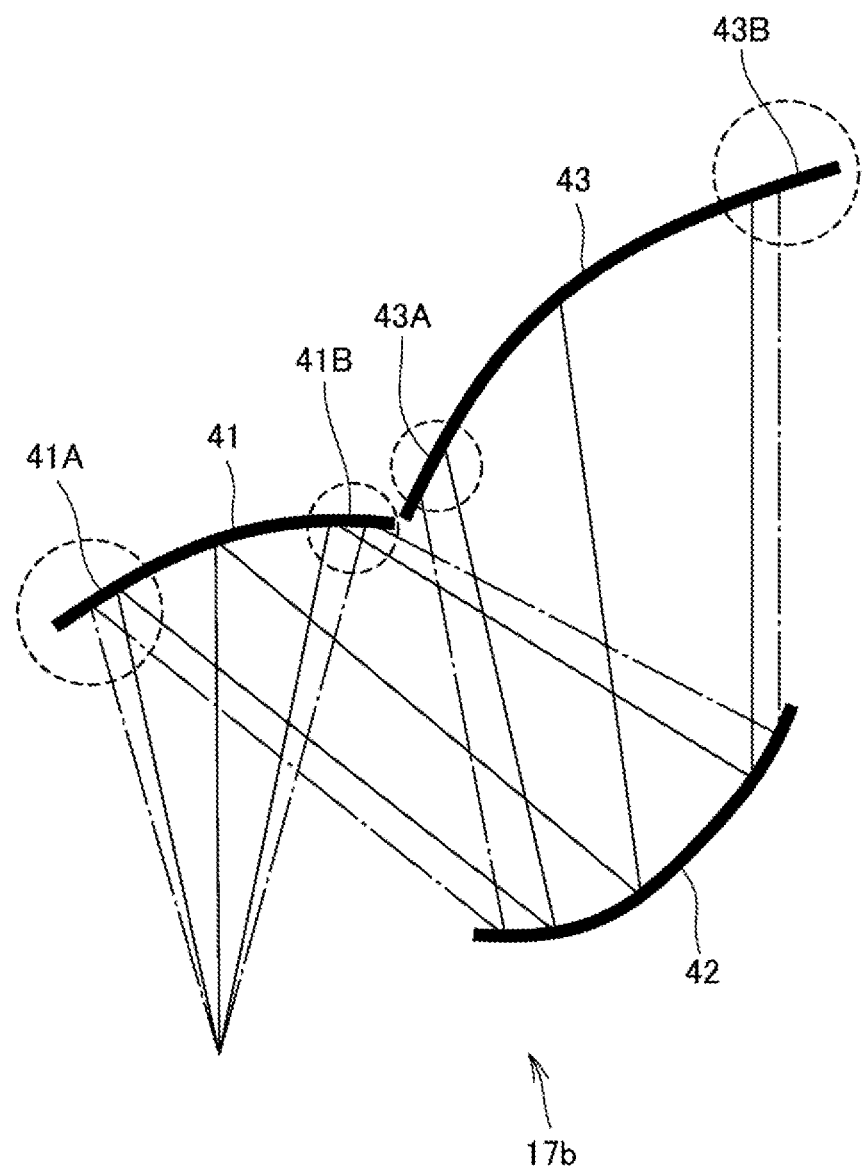
FIG. 5 is a diagram illustrating a strategy for reducing the size of the light-guiding unit.
Figure 5:
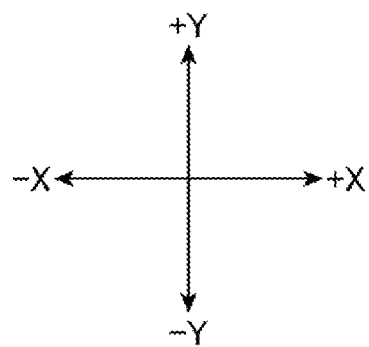

FIG. 5 is a diagram illustrating strategies for reducing the size of the light-guiding unit 17b.

FIG. 5 illustrates the first reflective optical system 41, the second optical system 42 and the third optical system 43 in the light-guiding unit 17b. In order to reduce the size of the light-guiding unit 17b in the X-axis direction while suppressing a reduction in the quality of the image viewed by the user, the following four strategies can be adopted.

First Strategy: Shorten a first end portion 41A in the −X direction of the first reflective optical system 41.

Specifically, form the first reflective optical system 41 such that the size of the first reflective optical system 41 is reduced in the −X direction at the first end portion 41A.

Second Strategy: Shorten a second end portion 41B in the +X direction of the first reflective optical system 41.

Specifically, form the first reflective optical system 41 such that the size of the first reflective optical system 41 is reduced in the +X direction at the second end portion 41B.

Third strategy: Shorten a third end portion 43A in the −X direction of the third optical system 43.

Specifically, form the third optical system 43 such that the size of the third optical system 43 is reduced in the −X direction at the third end portion 43A.

Fourth strategy: Shorten a fourth end portion 43B in the +X direction of the third optical system 43.

Specifically, form the third optical system 43 such that the size of the third optical system 43 is reduced in the +X direction at the fourth end portion 43B.

In the following description, the third strategy will be specifically described.

2. First Embodiment

A display apparatus 1 according to a first embodiment is a display apparatus for the left eye. In other words, the display apparatus 1 includes only the imaging light emitting unit 10b and the light-guiding unit 17b among the image light emitting unit 10a, the image light emitting unit 10b, the light-guiding unit 17a, and the light-guiding unit 17b.

By performing the third strategy on the light-guiding unit 17b, the size of the light-guiding unit 17b in the X-axis direction is reduced.

Specifically, the third end portion 43A in the −X direction of the third optical system 43 in the light-guiding unit 17b is shortened by a predetermined length L1. Through shortening the third end portion 43A by the predetermined length L1, an interval having the predetermined length L1 is formed between the first reflective optical system 41 and the third optical system 43. Thus, the interval between the first reflective optical system 41 and the third optical system 43 is shortened by the predetermined length L1. Therefore, the size of the light-guiding unit 17b in the X-axis direction can be reduced. As a result, the size of the display apparatus 1 can be reduced.

Figure 6:
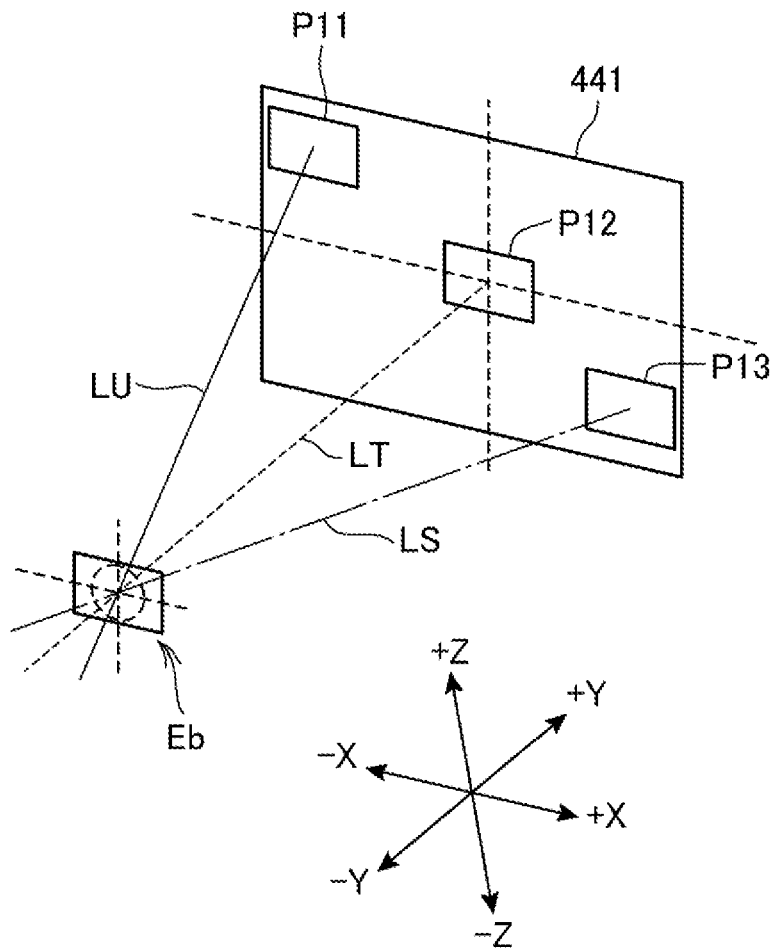
FIG. 6 is a diagram illustrating an exemplary shape of light flux incident on the second diffraction element corresponding to one pixel.
Figure 7:
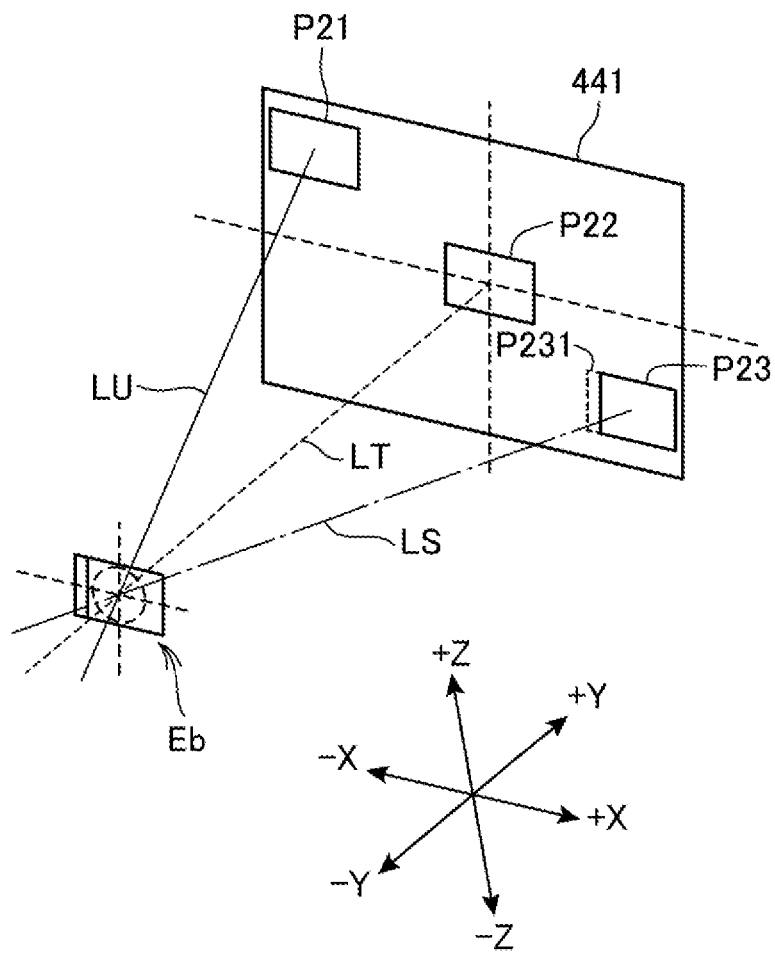
FIG. 7 is a diagram illustrating another exemplary shape of light flux incident on the second diffraction element corresponding to one pixel.

FIGS. 6 and 7 each illustrate an exemplary shape of light flux when the light flux is incident on the second diffraction element 441 corresponding to one pixel of the imaging light L0 emitted from the imaging light emitting unit 10b.

FIG. 6 is a diagram illustrating an exemplary shape of light flux when the light flux is incident on the second diffraction element 441 corresponding to one pixel of the imaging light L0 emitted from the imaging light emitting unit 10b and when the third end portion 43A in the −X direction of the third optical system 43 is shortened.

The second diffraction element 441 in FIG. 6 includes a rectangular pupil P11, a rectangular pupil P12, and a rectangular pupil P13. A "rectangular pupil" indicates the shape of light flux when one pixel of the imaging light L0 emitted from the imaging light emitting unit 10b is incident on the pupil Eb. Note that, in FIG. 6, the shape of the light flux incident on the second diffraction element 441 is illustrated as a rectangle, but the shape of the light flux may be circular or elliptical. The shape of the light flux may also be oval.

Although FIG. 6 includes the rectangular pupil P11, the rectangular pupil P12, and the rectangular pupil P13, the present embodiment is not limited thereto. A number of rectangular pupils corresponding to the number of pixels in the image indicated by the imaging light L0 may be provided. That is, each of the rectangular pupil P11, the rectangular pupil P12, and the rectangular pupil P13 represent an example of a rectangular pupil arranged in the second diffraction element 441.

Light flux corresponding to each of the rectangular pupil P11, the rectangular pupil P12 and the rectangular pupil P13 is reflected by the second diffraction element 441 and then emitted toward the left eye Eb.

The rectangular pupil P11 is disposed at the left end of the second diffraction element 441, the rectangular pupil P12 is disposed at the center of the second diffraction element 441, and the rectangular pupil P13 is disposed at the right end of the second diffraction element 441. When the third end portion 43A in the −X direction of the third optical system 43 is not shortened, light flux does not decrease in each of the rectangular pupil P11, the rectangular pupil P12, and the rectangular pupil P13.

FIG. 7 is a diagram illustrating an exemplary shape of light flux when the light flux is incident on the second diffraction element 441 corresponding to one pixel in the imaging light L0 emitted from the imaging light emitting unit 10a and when the third end portion 43A in the −X direction of the third optical system 43 is shortened.

The second diffraction element 441 in FIG. 7 includes a rectangular pupil P21, a rectangular pupil P22, and a rectangular pupil P23.

The rectangular pupil P21 is disposed at the left end of the second diffraction element 441 and corresponds to the rectangular pupil P11 in FIG. 6. The rectangular pupil P22 is disposed at the center of the second diffraction element 441 and corresponds to the rectangular pupil P12 of FIG. 6. The rectangular pupil P23 is disposed at the right end of the second diffraction element 441 and corresponds to the rectangular pupil P13 in FIG. 6.

The light flux does not decrease in the rectangular pupil P21 and the rectangular pupil P22, but does decrease in the rectangular pupil P23. Specifically, a left end portion P231 of the rectangular pupil P23 indicates a region of low light flux. In other words, the light flux reduces at the left end portion P231 of the rectangular pupil P23 located at the right end of the second diffraction element 441. This can be understood from FIG. 2 because light beams passing through the third end portion 43A of the third optical system 43 are located at the right end of the second diffraction element 441.

Figure 8:
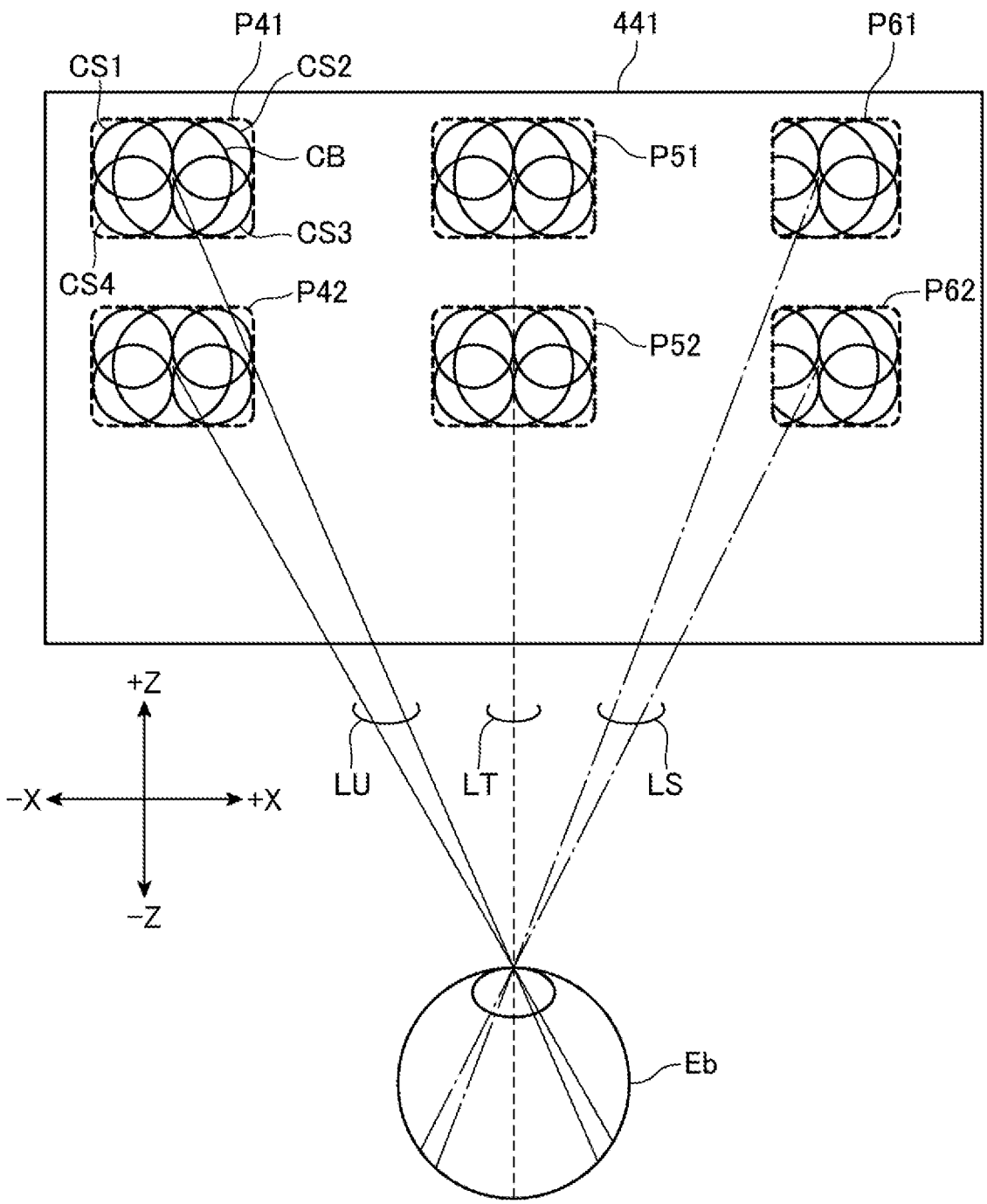
FIG. 8 is a diagram illustrating light flux shape when the size of a third optical system is reduced.

FIG. 8 is a diagram illustrating the shape of light flux when the size of the third optical system 43 is reduced. Specifically, FIG. 8 illustrates a rectangular pupil P41, a rectangular pupil P42, a rectangular pupil P51, a rectangular pupil P52, a rectangular pupil P61, and a rectangular pupil P62 when the third end portion 43A in the −X direction of the third optical system 43 is shortened. In FIG. 8, the diagram is deformed so as to illustrate a front view of the second diffraction element 441.

The rectangular pupil P41 and the rectangular pupil P42 are both located at the left end of the second diffraction element 441, the rectangular pupil P51 and the rectangular pupil P52 are both located at the center of the second diffraction element 441, and the rectangular pupil P61 and the rectangular pupil P62 are both located at the right end of the second diffraction element 441. The right end indicates a +X direction end.

Each of the rectangular pupil P41, the rectangular pupil P42, the rectangular pupil P51, the rectangular pupil P52, the rectangular pupil P61, and the rectangular pupil P62 are indicated by a large circle CB and small circles CS1 to CS4. The large circle CB indicates the pupil diameter of the imaging light incident on the left eye Eb for one pixel of imaging light when the left eye Eb faces forward. Each of the small circles CS1 to CS4 indicates the pupil diameter of the imaging light incident on the left eye Eb for one pixel of imaging light when the left eye Eb moves. In order to reduce interruption of an image when the left eye Eb is looking forward, the pupil diameter indicated by the large circle CB is larger than the pupil diameter indicated by each of the small circles CS1 to CS4.

The light flux does not reduce in each of the rectangular pupil P41, the rectangular pupil P42, the rectangular pupil P51, and the rectangular pupil P52, but does reduce in the rectangular pupil P61 and the rectangular pupil P62. Specifically, the left end portion of each of the rectangular pupil P61 and the rectangular pupil P62 indicates a region of low light flux. In other words, the light flux reduces at the left end portions of the rectangular pupil P61 and the rectangular pupil P62 located at the right end of the second diffraction element 441. The left end indicates a −X direction end.

Figure 9:
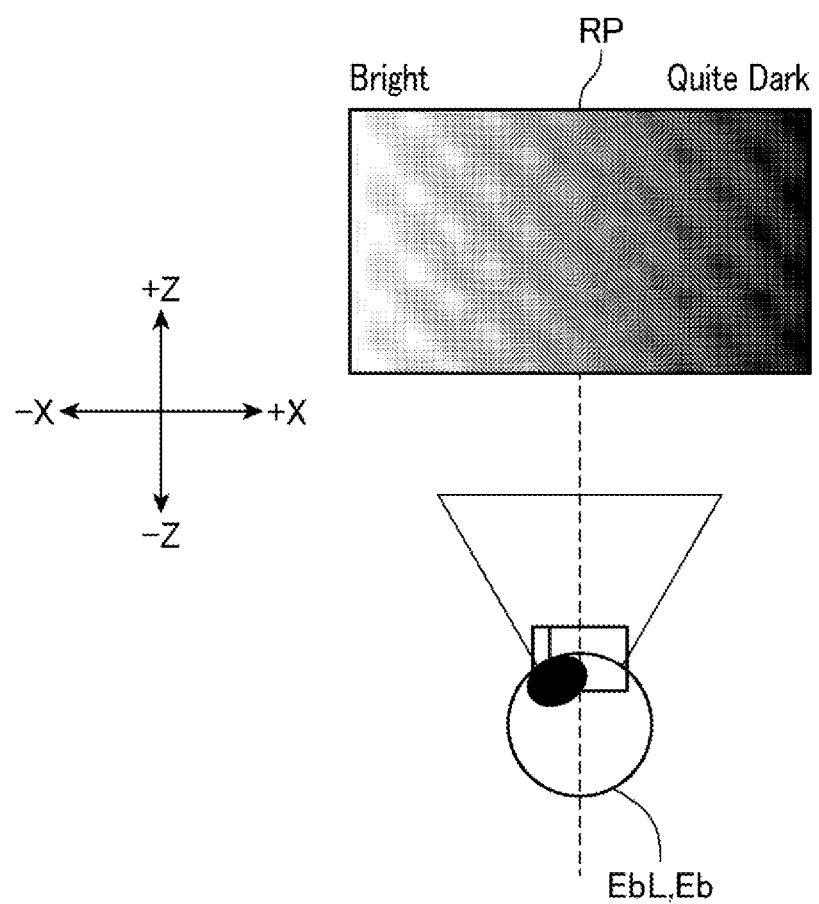
FIG. 9 is a conceptual diagram of image luminance corresponding to the line-of-sight direction of the left eye.
Figure 10:
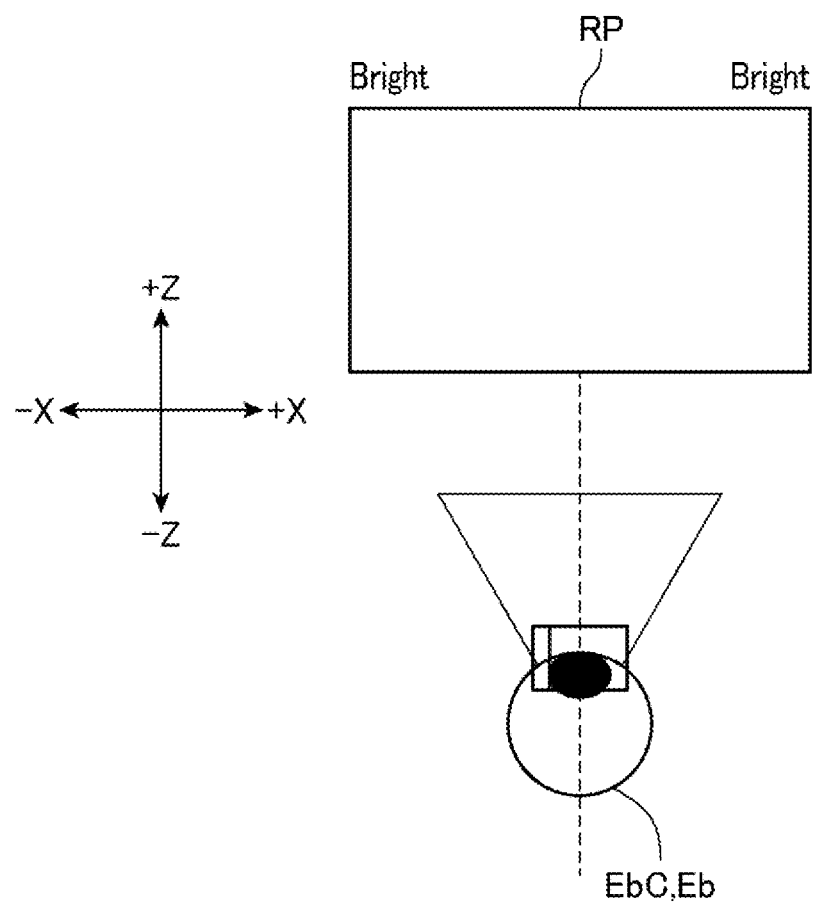
FIG. 10 is a conceptual diagram of image luminance corresponding to the line-of-sight direction of the left eye.
Figure 11:
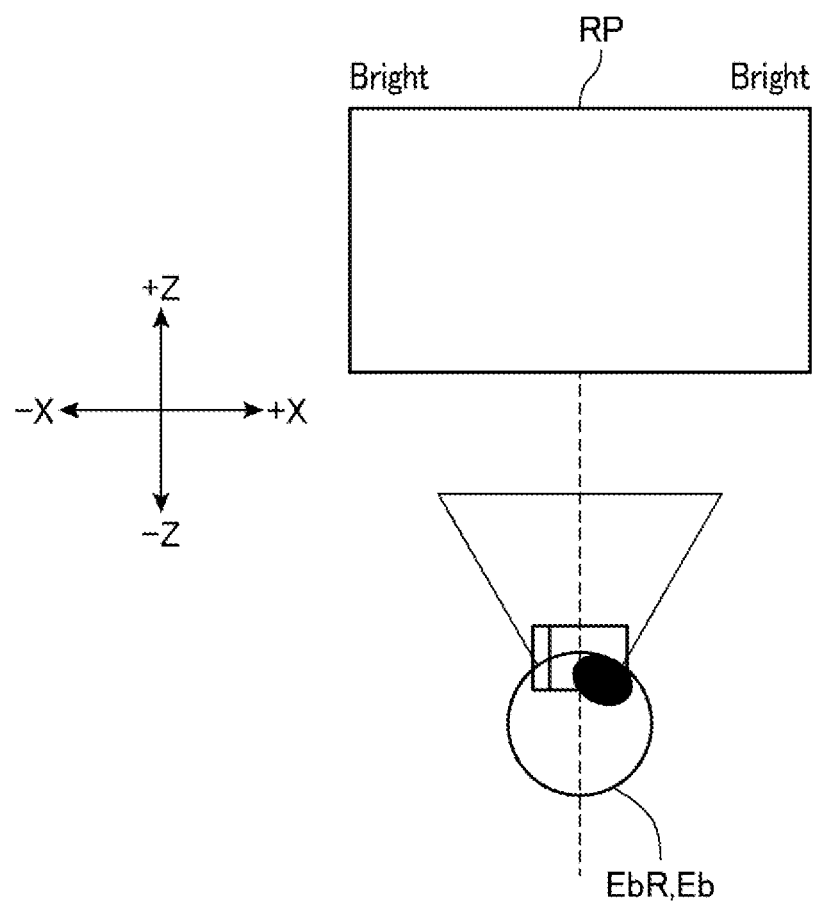
FIG. 11 is a conceptual diagram of image luminance corresponding to the line-of-sight direction of the left eye.

FIGS. 9, 10, and 11 each illustrate luminance of an image viewed by the left eye Eb of the user Eb, depending on the line-of-sight direction of the left eye Eb. In FIGS. 9, 10, and 11, the bottom of each figure illustrates the eyeball of the left eye Eb, and the top of each figure illustrates a luminance image RP indicating the brightness of the image viewed by the left eye Eb. The luminance image RP indicates the brightness of the image on the retina of the left eye Eb.

In FIG. 10, the line of sight of the left eye Eb is directed forward. A left eye EbC represents the eyeball of the left eye Eb with the line of sight directed forward. In FIG. 11, the line of sight of the left eye Eb is directed toward the front right. A left eye EbR represents the eyeball of the left eye Eb with the line of sight directed toward the front right.

As shown in the luminance image RP in FIG. 10 and the luminance image RP in FIG. 11, when the line of sight of the left eye Eb is directed forward or toward the front right, imaging light L0 for the total angle of view is incident on the iris of the right eye Ea without decreasing. Thus, the entire luminance image RP appears bright.

In FIG. 9, the line of sight of the left eye Eb is directed toward the front left. A left eye EbL represents the eyeball of the left eye Eb with the line of sight directed toward the front left. In this case, because little light flux enters from the right end of the second diffraction element 441, the amount of light entering from the right end of the second diffraction element 441 is smaller than the amount of light entering from the left end of the second diffraction element 441. Thus, in the luminance image RP, the left side appears bright and the right side appears dark.

In this case, a bright front left image can be ensured when the user tries to view the front left image so that the user experiences less of an uncomfortable feeling.

As described above, by shortening the third end portion 43A in the −X direction of the third optical system 43 such that the luminance of pixels at the right end position of the imaging light L0 is smaller than the luminance of pixels at the central position of the imaging light L0, the size of the light-guiding unit 17b in the X-axis direction can be reduced while also reducing the uncomfortable feeling experienced by the user. Note that the "right end position" corresponds to an example of an "end position". As a result, the size of the display apparatus 1 can be reduced.

In the first embodiment, a case has been described in which the third end portion 43A in the −X direction of the third optical system 43 is shortened, but the only requirement of the first embodiment is that the luminance of pixels at the right end position of the imaging light L0 be smaller than the luminance of pixels at the central position of the imaging light L0.

Note that pixels at a right-end position may be pixels at a right side position. That is, the luminance of pixels at the right side position of the imaging light L0 need only be smaller than the luminance of pixels at the central position of the imaging light L0.

In the first embodiment, the display apparatus 1 is a display apparatus for the left eye, but the display apparatus 1 may be configured as a display apparatus for the right eye, as illustrated in FIG. 3. In this case, the third end portion 43A in the −X direction of the third optical system 43 in the light-guiding unit 17a need only be shortened.

3. Second Embodiment

The display apparatus 1 according to the second embodiment is a display apparatus for the left eye. In other words, the display apparatus 1 includes only the image light emitting unit 10b and the light-guiding unit 17b among the image light emitting unit 10a, the image light emitting unit 10 b, the light-guiding unit 17a, and the light-guiding unit 17b.

Further, by performing the first strategy on the light-guiding unit 17b, the size of the light-guiding unit 17b in the X-axis direction is reduced. Specifically, the fourth end portion 43B in the +X direction of the third optical system 43 is shortened.

That is, when the line of sight of the left eye Eb is directed forward or toward the front left, light flux for the total angle of view decreases in the iris of the left eye Eb. Thus, there is little change in luminance change across the entire luminance image RP.

When the line of sight is directed toward the front right, light beams entering from the left end of the second diffraction element 441 are small, and therefore, the amount of light entering from the left end of the second diffraction element 441 is smaller than the amount of light entering from the right end of the second diffraction element 441. Thus, in the luminance image RP, the right side appears bright and the left side appears dark.

In this case, similar to the display apparatus 1 according to the first embodiment, a bright front right image can be ensured when the user tries to view the front right image so that the user experiences less of an uncomfortable feeling.

As described above, by shortening the fourth end portion 43B in the +X direction of the third optical system 43 such that the luminance of pixels at the left end position of the imaging light L0 is less than the luminance of pixels at the central position of the imaging light L0, the size of the light-guiding unit 17b in the X-axis direction can be reduced while also reducing the uncomfortable feeling experienced by the user. Note that the "left end position" corresponds to an example of an "end position". As a result, the size of the display apparatus 1 can be reduced.

In the second embodiment, a case has been described in which the fourth end portion 43B in the +X direction of the third optical system 43 is shortened, but the only requirement of the second embodiment is that the luminance of pixels at the left end position of the imaging light L0 be smaller than the luminance of pixels at the central position of the imaging light L0.

Note that the pixels at the left end position may be pixels on the left side. That is, the luminance of pixels on the left side of the imaging light L0 need only be smaller than the luminance of pixels at the central position of the imaging light L0.

In the second embodiment, the display apparatus 1 is a display apparatus for the left eye, but the display apparatus 1 may be a display apparatus for the right eye. In this case, the fourth end portion 43B in the +X direction of the third optical system 43 in the light-guiding unit 17a need only be shortened.

4. Third Embodiment

A display apparatus 1 according to a third embodiment is a display apparatus for both eyes. In other words, the display apparatus 1 includes the imaging light emitting unit 10a, the imaging light emitting unit 10b, the light-guiding unit 17a, and the light-guiding unit 17b. In the display apparatus 1 according to the third embodiment, the third strategy described with reference to FIG. 5 is performed on each of the light-guiding unit 17a and the light-guiding unit 17b to reduce the size of the light-guiding unit 17a and the light-guiding unit 17b in the X-axis direction.

Specifically, the third end portion 43A in the −X direction of the light-guiding unit 17*b* is shortened by the predetermined length L1. By shortening the third end portion 43A by the predetermined length L1, an interval having the predetermined length L1 is formed between the first reflective optical system 41 and the third optical system 43. Thus, the interval between the first reflective optical system 41 and the third optical system 43 is shortened by the predetermined length L1.

The third end portion 43A in the −X direction of the light-guiding unit 17*a* is also shortened by the predetermined length L1. By shortening the third end portion 43A by the predetermined length L1, an interval having the predetermined length L1 is formed between the first reflective optical system 41 and the third optical system 43. Thus, the interval between the first reflective optical system 41 and the third optical system 43 is shortened by the predetermined length L1.

As a result, the size of each of the light-guiding unit 17*a* and the light-guiding unit 17*b* in the X-axis direction can be reduced. Thus, the size of the display apparatus 1 can be reduced.

In this case, as described with reference to FIG. 9 to FIG. 11, when the line of sight of the left eye Eb is directed forward and when the line of sight of left eye Eb is directed toward the front right, the entire luminance image RP appears bright because imaging light L0 for the total angle of view is incident on the iris of the left eye Eb without decreasing. Additionally, when the line of sight of the left eye Eb is directed toward the front left, light flux entering from the right end of the second diffraction element 441 is small, and therefore, the amount of light entering from the right end of the second diffraction element 441 is smaller than the amount of light entering from the left end of the second diffraction element 441.

Figure 12:
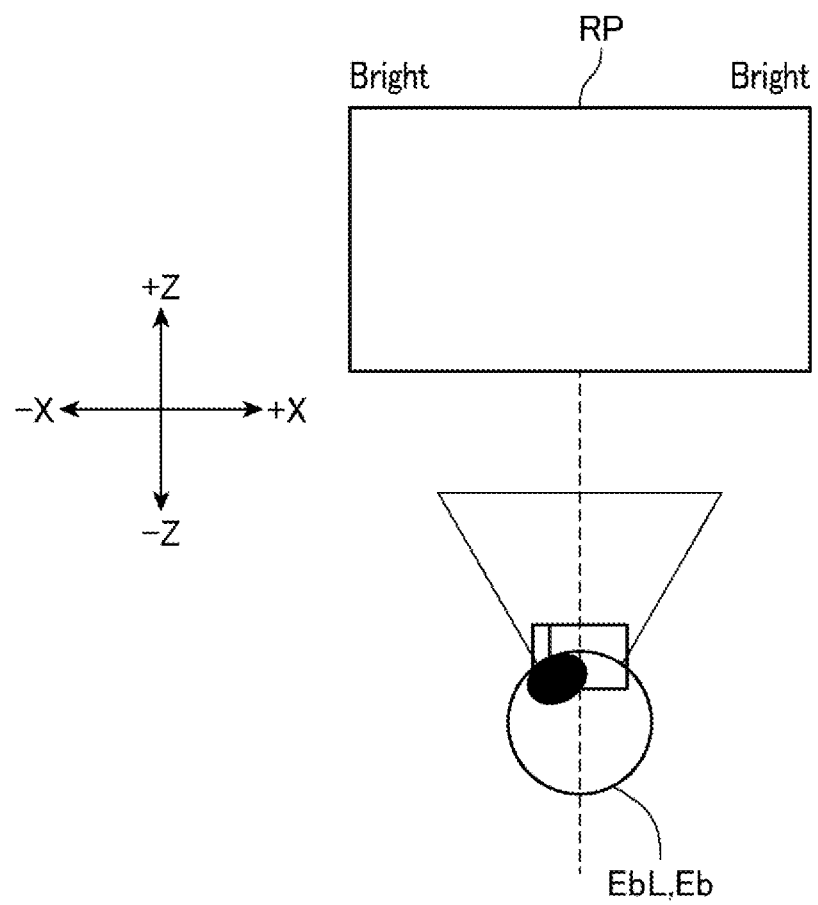
FIG. 12 is a conceptual diagram of image luminance corresponding to the line-of-sight direction of the right eye.
Figure 13:
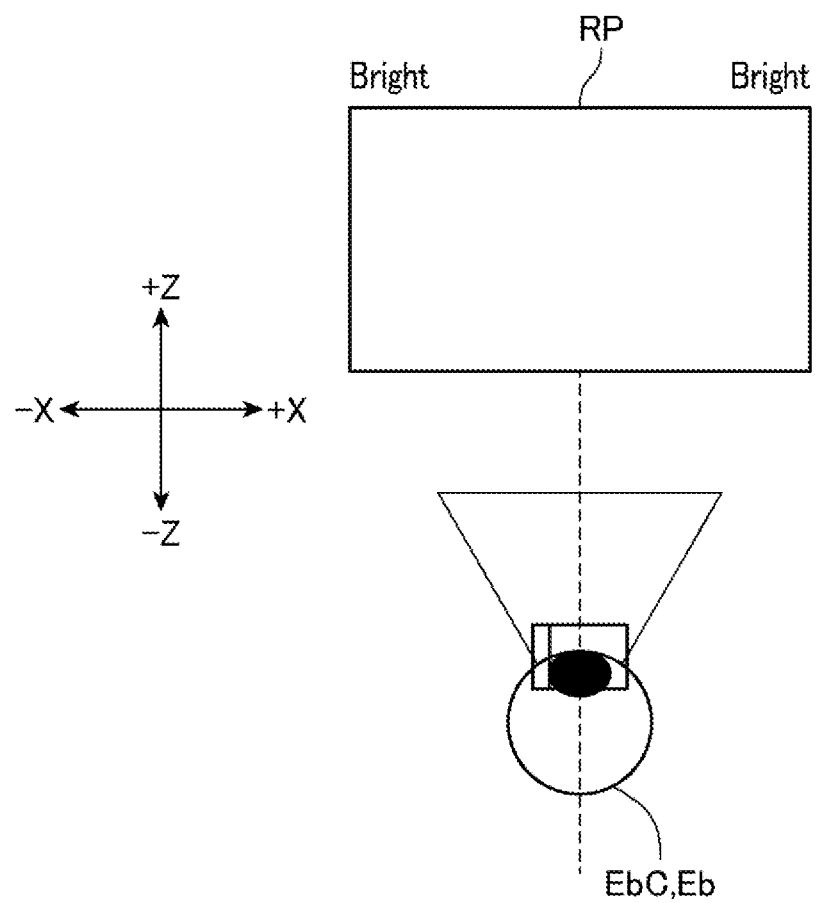
FIG. 13 is a conceptual diagram of image luminance corresponding to the line-of-sight direction of the right eye.
Figure 14:
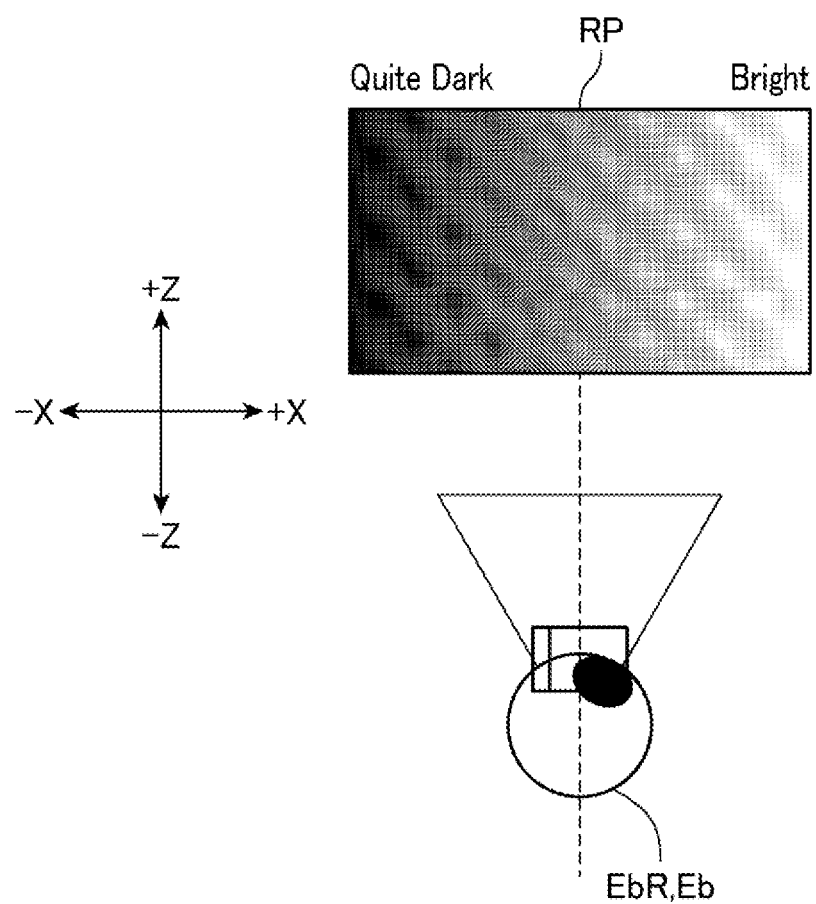
FIG. 14 is a conceptual diagram of image luminance corresponding to the line-of-sight direction of the right eye.

Each of FIGS. 12, 13, and 14 is a diagram illustrating the luminance of an image viewed by a right eye Ea of the user, depending on the line-of-sight direction of the right eye Ea. In FIGS. 12, 13, and 14, the bottom of each figure illustrates the eyeball of the right eye Ea and the top of each figure illustrates the luminance image RP indicating the luminance of the image visible in the right eye Ea.

In FIG. 12, the line of sight of the right eye Ea is directed toward the front left. A right eye EaL represents the eyeball of the right eye Ea with the line of sight directed toward the front left. In FIG. 13, the line of sight of the right eye Ea is directed forward. A right eye EaC represents the eyeball of the right eye Ea with the line of sight directed forward.

As illustrated in the luminance image RP in FIG. 12 and the luminance image RP in FIG. 13, when the line of sight of the right eye Ea is directed forward or toward the front left, the entire luminance image RP appears bright because imaging light L0 for the total angle of view is incident on the iris of the right eye Ea without decreasing.

In FIG. 14, the line of sight of the right eye Ea is directed toward the front right. A right eye EaR represents the eyeball of the right eye Ea with the line of sight directed toward the front right. In this case, light flux entering from the left end of the second diffraction element 441 is small, and therefore, the amount of light entering from the left end of the second diffraction element 441 is smaller than the amount of light entering from the right end of the second diffraction element 441. Thus, in the luminance image RP, the right side appears bright and the left side appears dark.

That is, when the line of sight of the right eye Ea is directed forward and the line of sight of the right eye Ea is directed toward the front left, imaging light L0 for the total angle of view is incident on the iris of the right eye Ea without decreasing. Additionally, when the line of sight of the right eye Ea is directed toward the right front, light flux entering from the left end of the second diffraction element 441 is small, and therefore, the amount of light entering from the left end of the second diffraction element 441 is smaller than the amount of light entering from the right end of the second diffraction element 441.

When the third end portion 43A in the −X direction of the light-guiding unit 17*b* and the third end portion 43A in the −X direction of the light-guiding unit 17*a* are shortened as described above, the following problems may arise.

When the user tries to view a front left image, the image generated by the light-guiding unit 17*b* and viewed by the left eye Eb appears brighter at the left end than at the right end. In contrast, the image generated by the light-guiding unit 17*a* and viewed by the right eye Ea appears bright throughout. In addition, when the user tries to view a front right image, the image generated by the light-guiding unit 17*b* and viewed by the left eye Eb appears bright throughout, and the image generated by the light-guiding unit 17*a* and viewed by the right eye Ea appears brighter at right end than at the left end.

As such, there is a difference in luminance between the image viewed by the left eye Eb and the image viewed by the right eye Ea and, as a result, the user may experience an uncomfortable feeling.

To resolve this problem, as described with reference to FIGS. 15 and 16, a luminance adjustment member 6 configured to adjust the luminance of the imaging light L0 is provided in each of the imaging light emitting unit 10*a* and the imaging light emitting unit 10*b*.

When the user tries to view the front left image, the luminance adjustment member 6 adjusts the image generated by the light-guiding unit 17*a* and viewed by the right eye Ea such that the right end appears darker than the left end. When the user tries to view the front right image, the luminance adjustment member 6 adjusts the image generated by the light-guiding unit 17*b* and viewed by the left eye Eb so that the left end appears darker than the right end.

Figure 15:
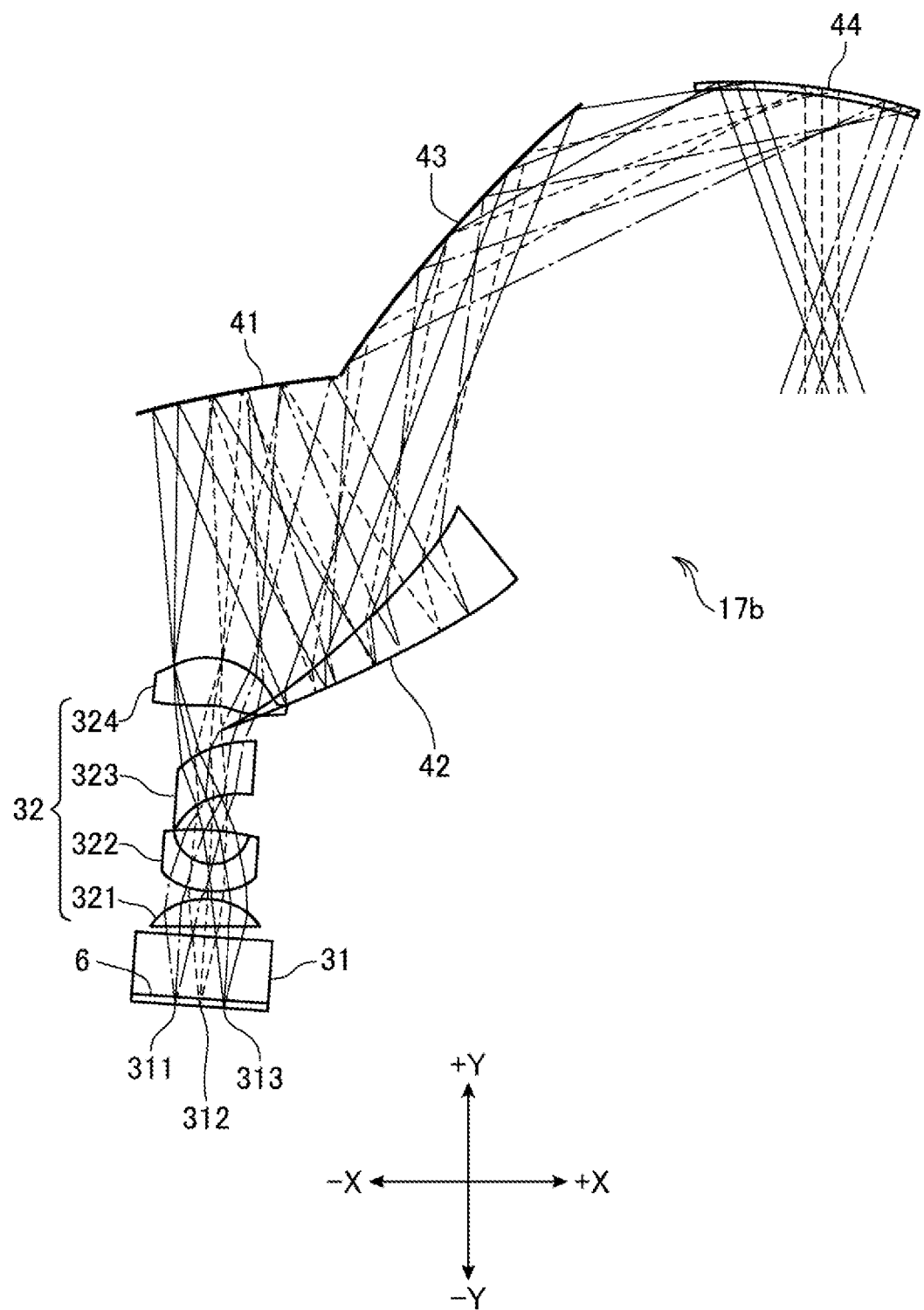
FIG. 15 is a diagram illustrating arrangement of a film for adjusting luminance of imaging light.
Figure 16:
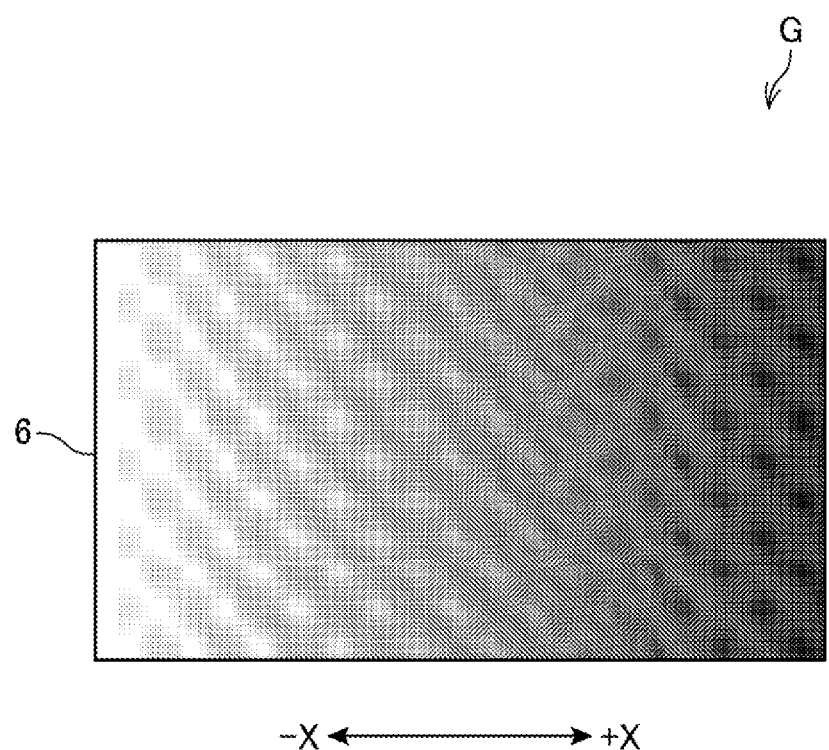
FIG. 16 is a diagram illustrating distribution of transmittance in the film for adjusting luminance of imaging light.

FIGS. 15 and 16 are diagrams illustrating an example of the luminance adjustment member 6 configured to adjust the luminance of the image light L0.

FIG. 15 is a diagram illustrating the position at which the luminance adjustment member 6 is disposed, and FIG. 16 is a diagram illustrating the distribution of transmittance throughout the luminance adjustment member 6.

The luminance adjustment member 6 is disposed in the light source unit 31 illustrated in FIG. 15, for example. In this case, the luminance adjustment member 6 is a gradation film, as illustrated in FIG. 16. The luminance adjustment member 6 is formed such that, for example, transmittance gradually decreases in the +X direction.

Specifically, the luminance adjustment member 6 is disposed in the imaging light emitting unit 10*b* such that the transmittance of the imaging light L0 emitted from the third pixel 313 decreases with respect to the imaging light L0 emitted from the first pixel 311. Further, the luminance adjustment member 6 is disposed in the imaging light emitting unit 10*a* such that the transmittance of the imaging light L0 emitted from the first pixel 311 decreases with respect to the imaging light L0 emitted from the third pixel 313.

In the display apparatus 1 according to the third embodiment, the luminance adjustment member 6 is disposed in the light source unit 31, but the luminance adjustment member 6 may be disposed between the second lens 322 and the third lens 323 in the projection optical system 32 illustrated in FIG. 15, for example. In this case, because the imaging light L0 converges between the second lens 322 and the third lens 323, the luminance adjustment member 6 is a film that can adjust brightness according to the incident angle. As a specific example, the luminance adjustment member 6 is a metal film.

For example, the luminance adjustment member 6 is a filter formed so as to further attenuate transmittance in line with an increase in the incident angle of imaging light emitted from pixels closer to pixels at the +X direction end of the OLED disposed in the light source unit 31.

In the display apparatus 1 according to the third embodiment, a case has been described in which the luminance adjustment member 6 is provided in the imaging light emitting unit 10a and the imaging light emitting unit 10b, but the luminance adjustment member 6 may be provided in the light-guiding unit 17a and the light-guiding unit 17b. For example, the luminance adjustment member 6 may be disposed in the first reflective optical system 41 or the third optical system 43.

As described with reference to FIGS. 2 and 3, the light-guiding unit 17a is arranged in plane symmetry with a plane that passes through the light-guiding unit 17b and a central position of the front member 15c of the frame 15 in the X-axis direction and is parallel to a Y-Z plane that includes the Y- and Z-axes. In this case, the luminance adjustment member 6 disposed in the light-guiding unit 17a is formed such that transmittance gradually decreases in the +X direction, similar to the luminance adjustment member 6 disposed in the light-guiding unit 17b described with reference to FIG. 16.

If the light-guiding unit 17a is disposed at the same orientation as the light-guiding unit 17b, the luminance adjustment member 6 disposed in the light-guiding unit 17a is formed such that transmittance gradually decreases in the −X direction, which is opposite to the luminance adjustment member 6 disposed in the light-guiding unit 17b described with reference to FIG. 16.

Figure 17:
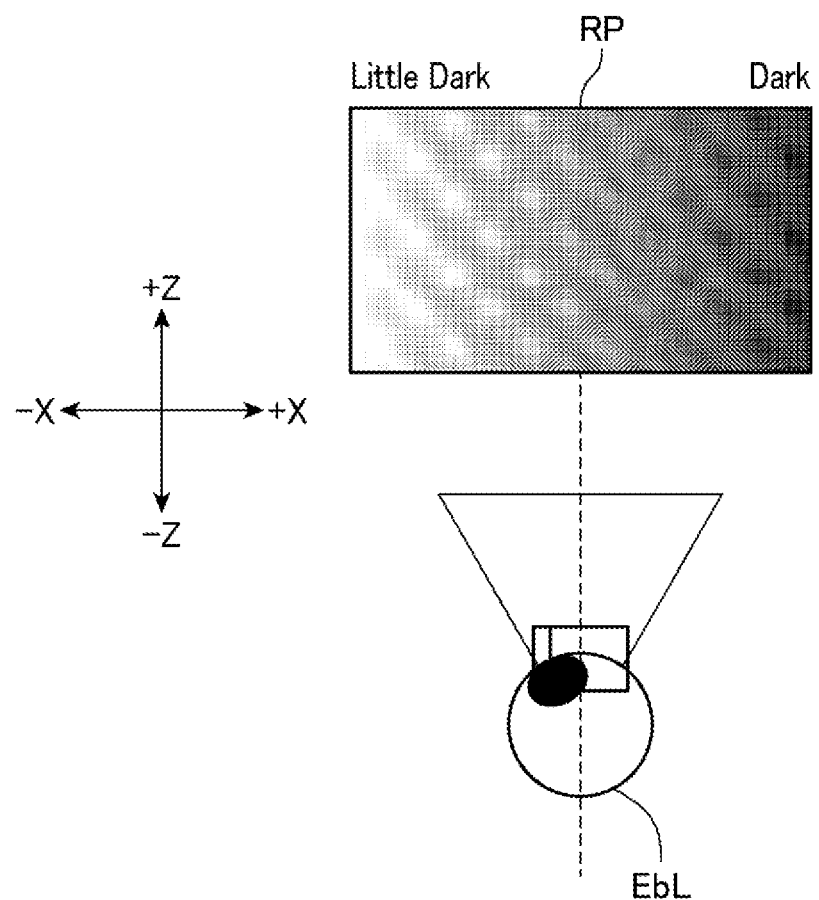
FIG. 17 is a conceptual diagram of image luminance when a luminance adjustment member is provided.
Figure 18:
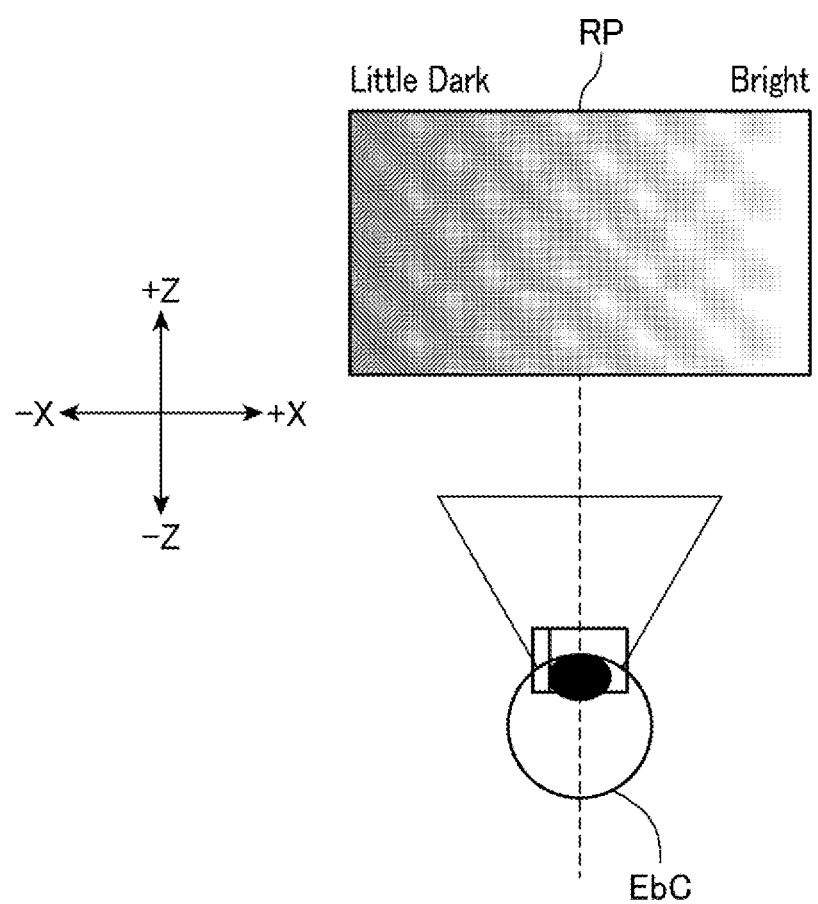
FIG. 18 is a conceptual diagram of image luminance when the luminance adjustment member is provided.
Figure 19:
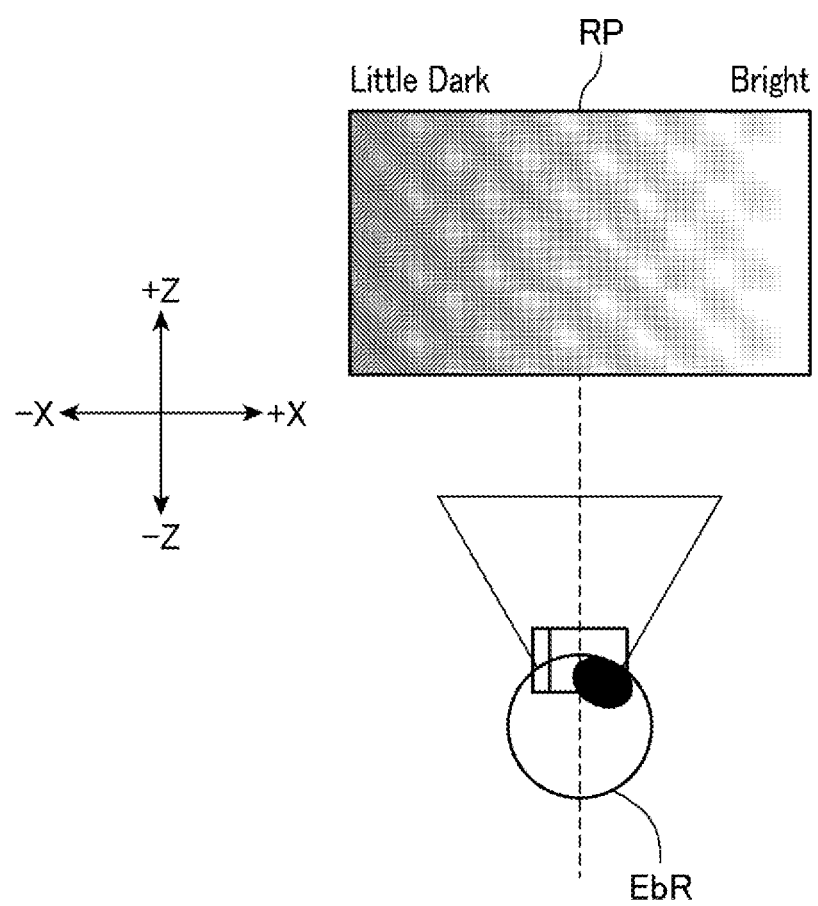
FIG. 19 is a conceptual diagram of image luminance when the luminance adjustment member is provided.

FIGS. 17, 18, and 19 are diagrams illustrating luminance of an image viewed by the left eye Eb according to the line-of-sight direction of the left eye Eb of the user when the luminance adjustment member 6 is provided.

In FIGS. 17, 18, and 19, the bottom of each figure illustrates the eyeball of the left eye Eb and the top of each figure illustrates the luminance image RP indicating the luminance of the image viewed by the left eye Eb.

In FIG. 18, the line of sight of the left eye Eb is directed forward. The left eye EbC represents the eyeball of the left eye Eb with the line of sight directed forward. In FIG. 19, the line of sight of the left eye Eb is directed toward the front right. The left eye EbR represents the eyeball of the left eye Eb with the line of sight directed toward the front right.

As illustrated in the luminance image RP in FIG. 18 and the luminance image RP in FIG. 19, after the luminance of the imaging light L0 is adjusted by the luminance adjustment member 6, the imaging light L0 for the total angle of view is incident on the iris of the left eye Eb without decreasing.

In FIG. 17, the line of sight of the left eye Eb is directed toward the front left. The left eye EbL represents the eyeball of the left eye Eb with the line of sight directed toward the front left. In this case, the light flux entering from the right end of the second diffraction element 441 is small, and therefore, the amount of light entering from the right end of the second diffraction element 441 is smaller than the amount of light entering from the left end of the second diffraction element 441. Thus, in the luminance image RP, the left side appears bright and the right side appears dark. However, because the luminance of the imaging light L0 is adjusted by the luminance adjustment member 6 such that the right side of the luminance image RP appears dark and the left side of the luminance image RP appears somewhat dark, the difference in luminance between the left end and the right end is reduced compared to the luminance image RP in FIG. 9.

In this way, the difference in luminance between the image viewed by the left eye Eb and the image viewed by the right eye Ea can be reduced because the difference in luminance between the left end and the right end of the luminance image RP is reduced. As a result, the uncomfortable feeling felt by the user can be reduced. If, for example, luminance of the region indicated by the word "Bright" in FIG. 19 is defined as 100, the uncomfortable feeling experienced by the user can be effectively and desirably reduced if the luminance of the region indicated by the words "Little Dark" in FIG. 19 is defined as 60 or greater because the difference in luminance between these regions is small.

In the third embodiment, a case has been described in which the difference in luminance between the left end and the right end of the luminance image RP is reduced, but the luminance distribution in the luminance image RP may be made left-right symmetrical. In this case, the uncomfortable feeling experienced by the user can be effectively reduced.

5. Fourth Embodiment

A display apparatus 1 according to a fourth embodiment is a display apparatus for both eyes. In other words, the display apparatus 1 includes the imaging light emitting unit 10a, the imaging light emitting unit 10b, the light-guiding unit 17a, and the light-guiding unit 17b. In the display apparatus 1 according to the fourth embodiment, the size of each of the light-guiding unit 17a and the light-guiding unit 17b in the X-axis direction is reduced by performing the first, second, third and fourth strategies described with reference to FIG. 5 on each of the light-guiding unit 17a and the light-guiding unit 17b. Hereinafter, the light-guiding unit 17b will be described in detail.

The first end portion 41A in the −X direction of the first reflective optical system 41 is shortened. The second end portion 41B in the +X direction of the first reflective optical system 41 is shortened by a predetermined length L2. Then, the third end portion 43A in the −X direction of the third optical system 43 is shortened by the predetermined length L1. Further, the fourth end portion 43B in the +X direction of the third optical system 43 is shortened.

Through shortening the second end portion 41B by the predetermined length L2 and shortening the third end portion 43A by the predetermined length L1, an interval having a predetermined length L3 is formed between the first reflective optical system 41 and the third optical system 43. The predetermined length L3 represents the sum of the predetermined length L1 and the predetermined length L2. Thus, the interval between the first reflective optical system 41 and the third optical system 43 is shortened by the predetermined length L3. Accordingly, the size of the light-guiding unit 17b in the X-axis direction can be reduced. As a result, the size of the display apparatus 1 can be reduced.

Figure 20:
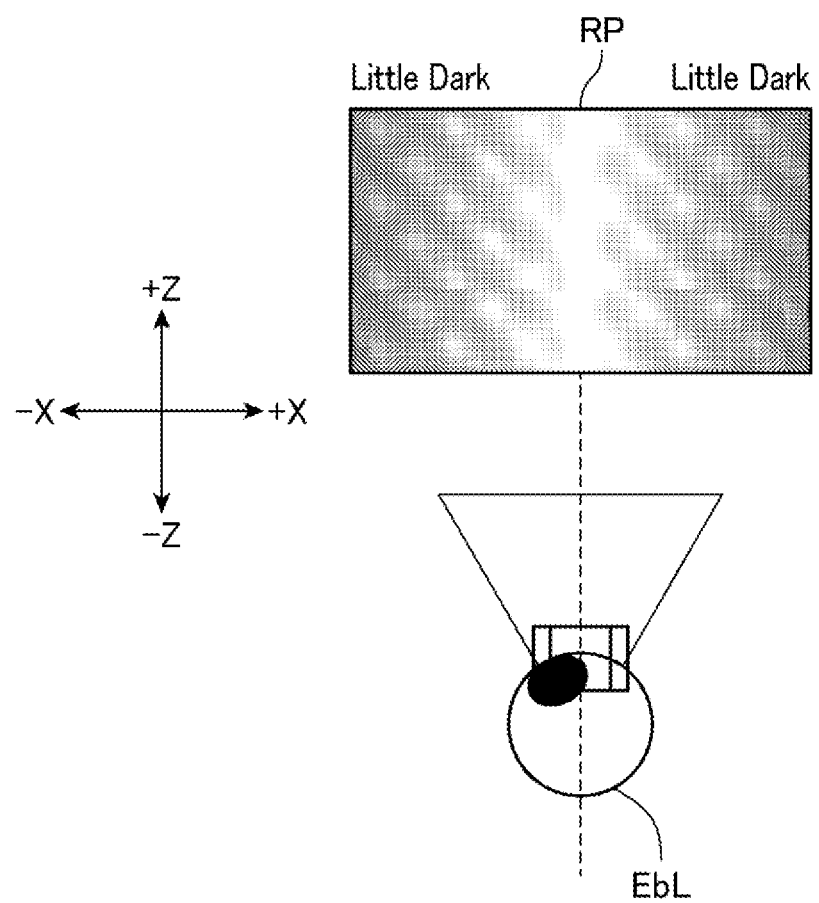
FIG. 20 is a conceptual diagram of image luminance when the sizes of a first optical system and the third optical system are reduced.
Figure 21:
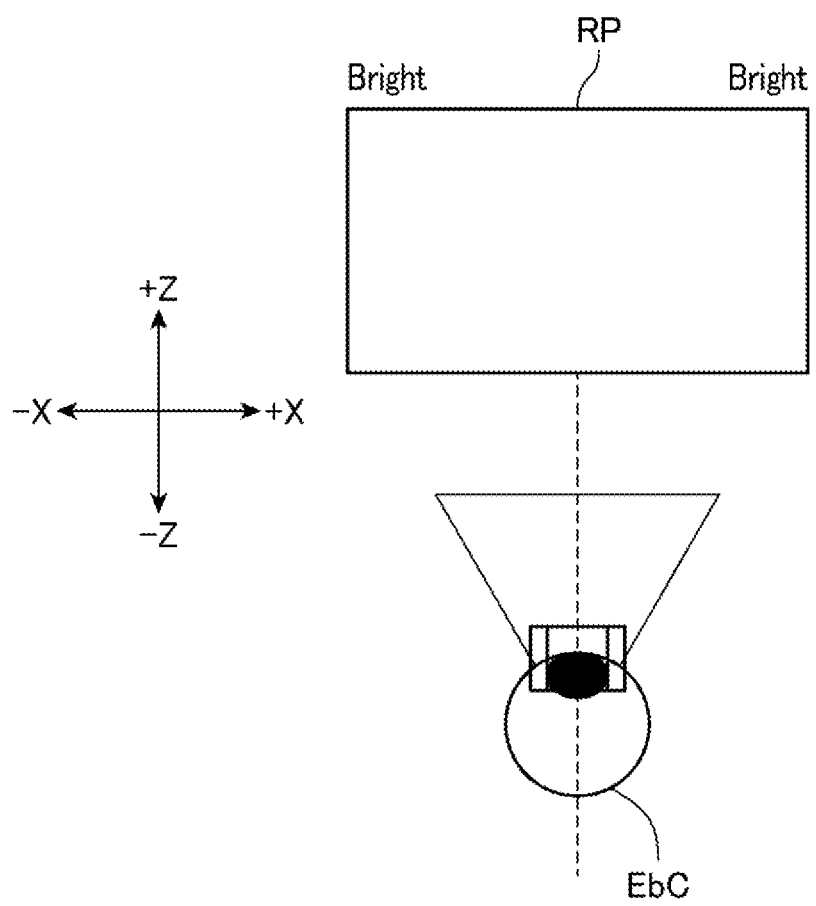
FIG. 21 is a conceptual diagram of image luminance when the sizes of the first optical system and the third optical system are reduced.
Figure 22:
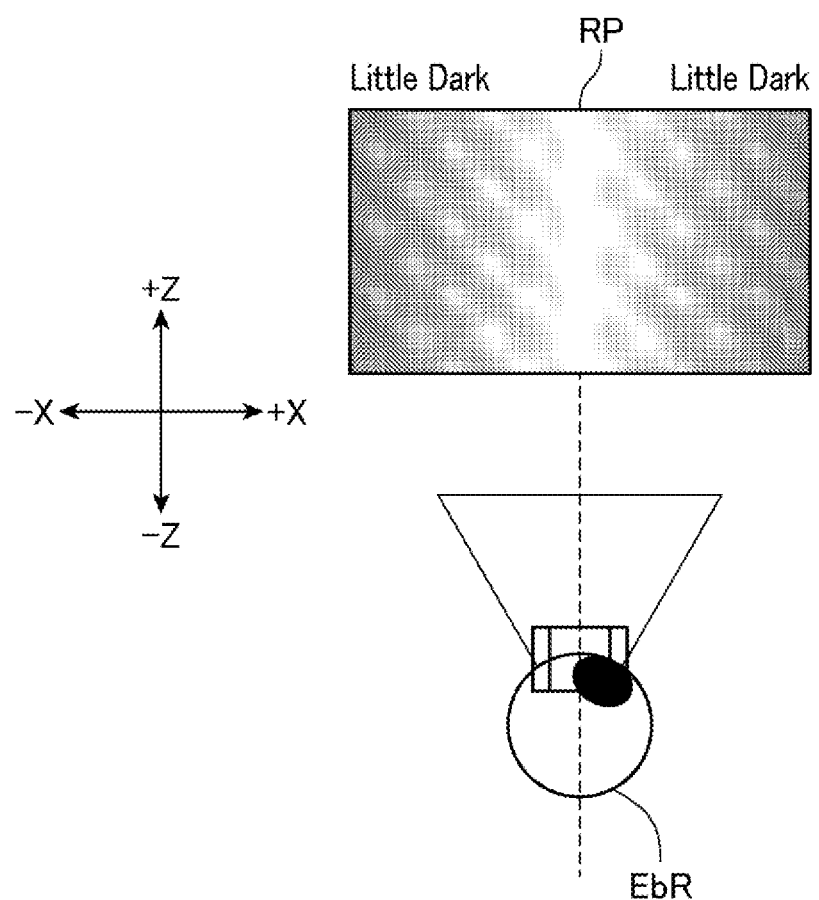
FIG. 22 is a conceptual diagram of image luminance when the sizes of the first optical system and the third optical system are reduced.

FIGS. 20, 21, and 22 illustrate luminance of the image viewed by the left eye Eb of the user, depending on the line-of-sight direction of the left eye Eb. In FIGS. 20, 21, and 22, the bottom of each figure illustrates the eyeball of the left eye Eb and the top of each figure illustrates the luminance image RP indicating the luminance of the image viewed by the left eye Eb. The luminance image RP indicates the brightness of the image at the exit pupil.

In FIG. 22, the line of sight of the left eye Eb is directed toward the front right. The left eye EbR represents the eyeball of the left eye Eb with the line of sight directed toward the front right.

In this case, light flux entering from the right end and the left end of the second diffraction element 441 is small, and therefore, the amount of light entering from the right end and the left end of the second diffraction element 441 is smaller than the amount of light entering from the central portion of the second diffraction element 441. Thus, in the luminance image RP, the central portion appears bright and the left end and the right end appear dark.

In FIG. 21, the line of sight of the left eye Eb is directed forward. The left eye EbC represents the eyeball of the left eye Eb with the line of sight directed forward.

As illustrated in the luminance image RP in FIG. 21, imaging light L0 for the total angle of view is incident on the iris of the left eye Eb. Thus, the entire luminance image RP appears bright.

In FIG. 20, the line of sight of the left eye Eb is directed toward the front left. The left eye EbL represents the eyeball of the left eye Eb with the line of sight directed toward the front left.

In this case, light flux entering from the right end and the left end of the second diffraction element 441 is small, and therefore, the amount of light entering from the right end and the left end of the second diffraction element 441 is smaller than the amount of light entering from the central portion of the second diffraction element 441. Thus, in the luminance image RP, the central portion appears bright and the left end and the right end appear dark.

In this case, the luminance image RP in FIG. 20, the luminance image RP in FIG. 21, and the luminance image RP in FIG. 22 are left-right symmetrical. In other words, the distribution of brightness in the exit pupil at the viewpoint position is left-right symmetrical.

Therefore, when the user tries to view the front left image, the luminance of the image generated by the light-guiding unit 17b and viewed by the left eye Eb is equal to the luminance of the image generated by the light-guiding unit 17a and viewed by the right eye Ea. When the user tries to view a forward image, the luminance of the image generated by the light-guiding unit 17b and viewed by the left eye Eb is equal to the luminance of the image generated by the light-guiding unit 17a and viewed by the right eye Ea. Further, when the user tries to view the front right image, the luminance of the image generated by the light-guiding unit 17b and viewed by the left eye Eb is equal to the luminance of the image generated by the light-guiding unit 17a and viewed by the right eye Ea. Thus, the uncomfortable feeling experienced by the user can be effectively suppressed.

In the luminance image RP in FIG. 20, luminance at the left and right ends is preferably greater than or equal to 60% of the luminance at the central portion. In the luminance image RP in FIG. 22, luminance at the left and right ends is preferably greater than or equal to 60% of the luminance at the central portion. When the luminance at the left and right ends is greater than or equal to 60% of the luminance at the central portion, it is possible to suppress the uncomfortable feeling experienced by the user.

In the display apparatus 1 according to the fourth embodiment, the first, second, third, and fourth strategies described with reference to FIG. 5 are adopted, but the fourth embodiment is not limited thereto. In the luminance image RP in drawings indicated by the reference sign p and the luminance image RP in drawings indicated by the reference sign R, the central portion need only appear bright and the left and right ends need only appear dark.

6. Summary

As described above, the display apparatus 1 according to the first and second embodiments of the present disclosure includes the imaging light emitting unit 10b configured to emit the imaging light L0 consisting of light of a plurality of pixels, and the light-guiding unit 17b configured to guide the imaging light L0. The light-guiding unit 17b is configured by arranging the first optical system 40, the second optical system 42, the third optical system 43, and the fourth optical system 44 in the stated order in the travel direction of the imaging light L0. The first optical system 40 forms a first intermediate image of the imaging light L0. The second optical system 42 includes a first diffraction element 421 that forms a pupil between the second optical system 42 and the fourth optical system 44. The third optical system 43 forms a second intermediate image. The fourth optical system 44 includes a second diffraction element 441 and collimates at least part of the imaging light L0 to form an exit pupil at a viewing position. At the exit pupil, the luminance of pixels at the central position of the imaging light L0 differs from the luminance of pixels at end positions.

Thus, in the first embodiment, by shortening the third end portion 43A in the –X direction of the third optical system 43, for example, the size of the light-guiding unit 17b in the X-axis direction can be reduced while suppressing the uncomfortable feeling experienced by the user. As a result, the size of the display apparatus 1 can be reduced.

Further, in the second exemplary embodiment, by shortening the fourth end portion 43B in the +X direction of the third optical system 43, for example, the size of the light-guiding unit 17b in the X-axis direction can be reduced while suppressing the uncomfortable feeling experienced by the user. As a result, the size of the display apparatus 1 can be reduced.

In addition, the luminance of the pixels at end positions in the fourth embodiment of the present disclosure is greater than or equal to 60% of the luminance of the pixels at the central position.

Thus, the uncomfortable feeling experienced by the user can be suppressed.

The imaging light emitting unit 10b or the light-guiding unit 17b according to the third embodiment of the present disclosure includes a luminance adjustment member 6 configured to adjust the luminance of the imaging light L0.

With this configuration, the difference in luminance between the pixels at the left end position and the pixels at the right end position can be reduced. Thus, the uncomfortable feeling experienced by the user can be suppressed.

In the display apparatus 1 according to the first and second embodiments of the present disclosure, the third optical system 43 includes the mirror M3 having a reflection surface that reflects the imaging light L0 emitted from the second optical system 42 toward the fourth optical system 44. In the mirror M3, at least one of the first end portion 43A on a side close to the first optical system 40 and the second end portion 43B farther from the first optical system 40 is shortened such that the luminance of the pixels at the central position of the imaging light L0 and the luminance of the pixels at the end positions of the imaging light L0 differ at the exit pupil PP3.

Accordingly, because at least one of the first end portion 43A on the side closer to the first optical system 40 and the second end portion 43B on the side farther from the first optical system 40 is shortened, the size of the light-guiding unit 17b in the X-axis direction can be reduced.

As described with reference to FIG. 5, in the display apparatus 1, the first optical system 40 includes the mirror Ml having a reflection surface that reflects the imaging light L0 emitted from the imaging light emitting unit 31 toward the second optical system 42. In the mirror Ml, at least one of the first end portion 41A on a side farther from the third optical system 43 and the second end portion 41B on a side closer to the third optical system 43 is shortened such that the luminance of the pixels at the central position of the imaging light L0 and the luminance of the pixels at the end positions of the imaging light L0 differ at the exit pupil PP3.

Accordingly, because at least one of the first end portion 41A on the side farther from the third optical system 43 and the second end portion 41B on the side closer to the third optical system 43 is shortened, the size of the light-guiding unit 17b in the X-axis direction can be reduced.

The exemplary embodiments described above are preferred embodiments of the present disclosure. However, the present disclosure is not limited to the embodiments described above, and various modifications are possible within a scope that does not depart from the gist of the present disclosure.

For example, the display apparatus may be configured as an HMD mounted on a vehicle such as a car or an airplane. The display apparatus may also be configured as, for example, an HMD built into body armor such as a helmet. In this case, a portion used to position the display apparatus on the body of the user and a portion positioned with respect to that portion may be configured as portions to be worn by the user.

Further, the configuration described above in the exemplary embodiments in which the user views the outside scene through a display unit is not limited to a configuration where outside light enters through the fourth optical system 44. For example, the present disclosure can also be applied to a display apparatus configured to display an image while the outside scene cannot be viewed. Specifically, the present disclosure can be applied to a display apparatus configured to display images captured by a camera, images and computer graphics generated based on these captured images, moving images based on moving image data stored in advance or input from an external source, or the like. Such a display apparatus can include a so-called closed-type display apparatus in which an outside scene cannot be viewed. With, for example, a configuration in which composite images created by combining images of outside scenery captured by a camera and display images are displayed by the imaging light emitting unit 10a, the light-guiding unit 17a, the imaging light emitting unit 10b, and the light-guiding unit 17b, the display apparatus can display outside scenery and images to be viewed by the user even if the fourth optical system 44 does not transmit outside light. Of course, it is also possible to apply the present disclosure to such a so-called video see-through display apparatus.

What is claimed is:

1. A virtual image display apparatus, comprising:
an imaging light emitting unit for a left eye of a user configured to emit imaging light constituted by light of a plurality of pixels; and
a light-guiding unit for the left eye of the user configured to guide the imaging light,
the light-guiding unit configured by arranging a first optical system, a second optical system, a third optical system, and a fourth optical system in this order in a travel direction of the imaging light,
the first optical system forming a first intermediate image of the imaging light;
the second optical system including a first diffraction element forming a pupil between the second optical system and the fourth optical system;
the third optical system forming a second intermediate image;
the fourth optical system including a second diffraction element forming an exit pupil by diffracting the imaging light, wherein
at the exit pupil, luminance of the pixels at a central position of the imaging light differs from luminance of the plurality of pixels at an end position of the imaging light,
the third optical system includes a first mirror having a reflective surface that reflects the imaging light emitted from the second optical system toward the fourth optical system; and
a first end portion of the first mirror on a side close to the first optical system is shortened such that the luminance of the pixels at the central position of the imaging light and the luminance of the pixels at a right end position of the imaging light differ at the exit pupil.

2. The virtual image display apparatus according to claim 1, wherein
the luminance of the pixels at the end position is greater than or equal to 60% of the luminance of the pixels at the central position.

3. The virtual image display apparatus according to claim 1, wherein
the imaging light emitting unit or the light-guiding unit includes a luminance adjustment member configured to adjust luminance of the imaging light.

4. The virtual image display apparatus according to claim 1, wherein:
the first optical system includes a second mirror having a reflective surface that reflects the imaging light emitted from the imaging light emitting unit toward the second optical system; and
at least one of a first end portion of the second mirror on a side far from the third optical system and a second end portion of the second mirror on a side close to the third optical system is shortened such that the luminance of the pixels at the central position of the imaging light and the luminance of the pixels at the end position of the imaging light differ at the exit pupil.

5. A virtual image display apparatus, comprising:
an imaging light emitting unit for a right eye of a user configured to emit imaging light constituted by light of a plurality of pixels; and
a light-guiding unit for the right eye of the user configured to guide the imaging light,
the light-guiding unit configured by arranging a first optical system, a second optical system, a third optical system, and a fourth optical system in this order in a travel direction of the imaging light,
the first optical system forming a first intermediate image of the imaging light;
the second optical system including a first diffraction element forming a pupil between the second optical system and the fourth optical system;
the third optical system forming a second intermediate image;

the fourth optical system including a second diffraction element forming an exit pupil by diffracting the imaging light, wherein at the exit pupil, luminance of the pixels at a central position of the imaging light differs from luminance of the plurality of pixels at an end position of the imaging light, the third optical system includes a first mirror having a reflective surface that reflects the imaging light emitted from the second optical system toward the fourth optical system; and a first end portion of the first mirror on a side close to the first optical system is shortened such that the luminance of the pixels at the central position of the imaging light and the luminance of the pixels at a left end position of the imaging light differ at the exit pupil.

6. The virtual image display apparatus according to claim 5, wherein the luminance of the pixels at the end position is greater than or equal to 60% of the luminance of the pixels at the central position.

7. The virtual image display apparatus according to claim 5, wherein the imaging light emitting unit or the light-guiding unit includes a luminance adjustment member configured to adjust luminance of the imaging light.

8. The virtual image display apparatus according to claim 5, wherein:

the first optical system includes a second mirror having a reflective surface that reflects the imaging light emitted from the imaging light emitting unit toward the second optical system; and at least one of a first end portion of the second mirror on a side far from the third optical system and a second end portion of the second mirror on a side close to the third optical system is shortened such that the luminance of the pixels at the central position of the imaging light and the luminance of the pixels at the end position of the imaging light differ at the exit pupil.

* * * * *